(12) United States Patent
Mortensen et al.

(10) Patent No.: US 12,447,451 B2
(45) Date of Patent: Oct. 21, 2025

(54) GAS HEATER

(71) Applicant: HALDOR TOPSØE A/S, Kgs. Lyngby (DK)

(72) Inventors: Peter Mølgaard Mortensen, Roskilde (DK); Kasper Emil Larsen, Humlebæk (DK); Kim Aasberg-Petersen, Allerød (DK); Robert Klein, Roskilde (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 225 days.

(21) Appl. No.: 17/782,341

(22) PCT Filed: Dec. 3, 2020

(86) PCT No.: PCT/EP2020/084414
§ 371 (c)(1),
(2) Date: Jun. 3, 2022

(87) PCT Pub. No.: WO2021/110809
PCT Pub. Date: Jun. 10, 2021

(65) Prior Publication Data
US 2023/0001368 A1   Jan. 5, 2023

(30) Foreign Application Priority Data

Dec. 4, 2019 (EP) .................... 19213438

(51) Int. Cl.
*B01J 3/04* (2006.01)
*B01J 12/00* (2006.01)
*B01J 19/00* (2006.01)

(52) U.S. Cl.
CPC ............... *B01J 3/04* (2013.01); *B01J 12/005* (2013.01); *B01J 19/0013* (2013.01); *B01J 2219/00135* (2013.01); *B01J 2219/24* (2013.01)

(58) Field of Classification Search
CPC ......... B01J 3/00; B01J 3/04; B01J 6/00; B01J 7/00; B01J 12/00; B01J 12/002; B01J 12/005; B01J 19/00; B01J 19/0006; B01J 19/0013; B01J 19/24; B01J 19/32; B01J 2219/00; B01J 2219/00049;
(Continued)

(56) References Cited

U.S. PATENT DOCUMENTS

| 4,505,107 A | 3/1985 | Yamaguchi |
|---|---|---|
| 5,194,229 A | 3/1993 | Abe |

(Continued)

FOREIGN PATENT DOCUMENTS

| CN | 101832642 U | 9/2010 |
|---|---|---|
| CN | 202336644 U | 7/2012 |

(Continued)

OTHER PUBLICATIONS

Machine translation of JPH056120 U, which was provided in IDS filed on May 13, 2024 and published on Jan. 29, 1993 (Year: 1993).*

(Continued)

*Primary Examiner* — Natasha E Young
(74) *Attorney, Agent, or Firm* — Boone IP Law

(57) ABSTRACT

A heating system and a process for heating a pressurized feed gas is provided, where the heat for the reaction is provided by resistance heating by means of electrical power.

15 Claims, 12 Drawing Sheets

(58) Field of Classification Search
CPC .... B01J 2219/00051; B01J 2219/00132; B01J 2219/00135; B01J 2219/0015; B01J 2219/24; B01J 2219/32; B01J 2219/324
See application file for complete search history.

(56) References Cited

U.S. PATENT DOCUMENTS

| | | | |
|---|---|---|---|
| 5,446,264 | A | 8/1995 | Kondo |
| 5,449,541 | A | 9/1995 | Lipp |
| 5,680,503 | A | 10/1997 | Abe |
| 6,841,134 | B2 | 1/2005 | Hanus |
| 11,905,173 | B2 * | 2/2024 | Mortensen .............. C01B 3/384 |
| 2009/0252919 | A1 | 10/2009 | Ogura |
| 2015/0129805 | A1 | 5/2015 | Karpenko et al. |
| 2021/0113983 | A1 * | 4/2021 | Mortensen ............ C01C 3/0208 |
| 2022/0242727 | A1 * | 8/2022 | Mortensen ........... B01J 19/2485 |
| 2022/0259056 | A1 * | 8/2022 | Mortensen ................. B01J 3/04 |
| 2022/0298015 | A1 * | 9/2022 | Mortensen .......... B01J 19/0053 |
| 2022/0362736 | A1 * | 11/2022 | Mortensen ........... B01J 19/2485 |
| 2022/0363537 | A1 * | 11/2022 | Mortensen ............ B01J 23/755 |
| 2022/0395805 | A1 * | 12/2022 | Mortensen ............... B01J 19/32 |
| 2022/0410109 | A1 * | 12/2022 | Mortensen .......... B01J 19/1812 |

FOREIGN PATENT DOCUMENTS

| | | |
|---|---|---|
| CN | 203177465 U | 9/2013 |
| EP | 3574991 A1 | 4/2019 |
| GB | 1562346 | 3/1980 |
| IN | 200787 | 6/2004 |
| JP | H056120 U | 1/1993 |
| WO | 2019/110268 A1 | 11/2018 |
| WO | 2019110266 A1 | 6/2019 |
| WO | 2019110267 A1 | 6/2019 |
| WO | 2019228796 A1 | 12/2019 |
| WO | 2019228797 A1 | 12/2019 |
| WO | 2019228798 A1 | 12/2019 |
| WO | 2021/063794 A1 | 4/2021 |
| WO | 2021/063795 A1 | 4/2021 |
| WO | 2021/063796 A1 | 4/2021 |
| WO | 2021/063799 A1 | 4/2021 |
| WO | 2021063792 A1 | 4/2021 |
| WO | 2021063793 A1 | 4/2021 |
| WO | 2021/094346 A1 | 5/2021 |

OTHER PUBLICATIONS

European Search Report dated Apr. 29, 2020 for European Application No. 19213438.5 (7 pages).
International Search Report (PCT/ISA/210) and Written Opinion (PCT/ISA/237) mailed on Feb. 16, 2021, by the European Patent Office as the International Searching Authority for International Application No. PCT/EP2020/084414.
Chinese Third Office Action mailed on Apr. 25, 2024 in corresponding Chinese Application No. 2020800833339, with English language translation, 27 pages.
Dong Guanghua et al., "Introduction to Energy Chemistry, Textbook for the Thirteenth Five-Year Plan for Higher Education", p. 124, Xuzhou: China University of Mining and Technology Press, Sep. 2018. Relevance via Chinese Third Office Action.
EPO Opposition Citation 5a: Danish Priority Document (PA201901145) of WO 2021/063792 A1, Filed 2025.
EPO Opposition Citation 6a: Danish Priority Document (PA201901148) of WO 2021/063793 A1, Filed 2025.
EPO Opposition Citation 7a: Danish Priority Document (PA201901147) of WO 2021/063794 A1, Filed 2025
EPO Opposition Citation 8a: Danish Priority Document (PA201901146) of WO 2021/063795 A1, Filed 2025.
EPO Opposition Citation 9a: Danish Priority Document (PA201901149) of WO 2021/063796 A1, Filed 2025.
EPO Opposition Citation 10a: Danish Priority Document (PA201901150) of WO 2021/063799 A1, Filed 2025.
EPO Opposition Citation 11a: Danish Priority Document (PA201901324) of WO 2021/094346 A1, Filed 2025.
EPO Opposition Citation 17: Product description at https://www.alloystrip.com/high-heating-resistance alloy/fecral-alloy/fecral-bar-china-suppliers-fec, Filed 2025.
EPO Opposition Citation 18: Extract from "Chemistry of the Elements" by Greenwood and Earnshaw, 1984.
EPO Opposition Citation 19: The story of the "INCOLOY® alloys series" from 800 through 800H, 800HT®, 2004.
EPO Opposition Citation 20: Milne, J.E. and Giler, R. "Nickel Chromium alloys for electric resistance heating", 1990.
EPO Opposition Citation 21: Galetz, M.C. "Coatings for Superalloys", Chapter 12 from Superalloys, 2015.
EPO Opposition Citation 22: Lucentini, I. "Review of the Decomposition of Ammonia to Generate Hydrogen", Ind. Eng. Chem. Res. 2021, 60, 18560-18611.
EPO Opposition Citation 23: Wikipedia entry for "Oxyhydrogen", Oct. 25, 2024.
EPO Opposition Citation 24: Wikipedia entry for "Cracking (chemistry)", Oct. 25, 2024.
Notice of Opposition To a European Patent, in corresponding European Patent No. EP 4069414, mailed Oct. 30, 2024, 7 pages.
Opponent's Grounds of Opposition, in corresponding European Patent No. EP 4069414, mailed Oct. 30, 2024, 24 pages.
Reply of Patent Proprietor, in corresponding European Patent No. EP 4069414, mailed Mar. 12, 2025, 47 pages.
Official Action, in corresponding Canadian Patent Application No. 3,163,744, mailed May 13, 2025, 7 pages.
Reply To Reply of Patent Proprietor, in corresponding European Patent No. EP 4069414, mailed Jul. 9, 2025, 32 pages.
EPO Opposition Citation Annex 1: Geometric Surface Area Calculations of D14, mailed Jul. 9, 2025, 1 page.
EPO Opposition Citation D28: Thermcraft Inc., "Electrical Resistance Heating Elements: An Overview," [Available from URL: https://thermcraftinc.com/wp-content/uploads/2018/01/Heating_Element_Seminar_Nov_2_2016.pdf], Nov. 2, 2016, 30 pages.
EPO Opposition Citation D29: S. Duscher, "Ceramic Honeycombs for Thermal and Process Engineering," Ceramic Applications, 2014, 2:34-39.

* cited by examiner

GAS HEATER

This application is a U.S. National Stage Entry of International Patent Application Serial Number PCT/EP2020/084414, now WO 2021/110809, filed Dec. 3, 2020, which claims priority to European Patent Application No. EP19213438.5, filed Dec. 4, 2019, the entire contents of all of which are incorporated herein by reference.

TECHNICAL FIELD

A heating system and a process for carrying out heating of a pressurized feed gas are provided, where the heat is provided by resistance heating.

BACKGROUND

Typically gas heat exchangers are limited in design temperature, as they are also pressure baring equipment, which typically limits the maximum operating temperature of these. A classical configuration of heat exchange is the tube and shell type, where one gas flowing on the tube side heat exchanges with another gas on the shell side to thereby heat the first gas and cool the second gas, or vice versa. It is desirable to develop a heating system, specifically a gas preheater, which allows for heating gas systems to very high temperatures. It is also desirable to develop a heating system which is compact and simple to operate. Another advantage of the present technology is that the overall emission of carbon dioxide and other emissions detrimental to the climate may be reduced considerably, in particular if the power used in the heating system is from renewable energy resources.

Preheating of gas is needed in many aspects of chemical process design. Examples of gas preheaters includes preheating for reduction gas used for activation of catalyst beds. Another use of a gas preheater is the example of a $CO_2$ preheater to an Adiabatic POst Convertor (APOC). The APOC reactor is described in WO 2019/110267. In both cases, it can be desirable to have a very high gas preheating temperature to enable the interplay of the downstream unit operation.

SUMMARY

The present technology thus provides a heating system for heating of a feed gas, said heating system comprising:
  a supply of feed gas;
  a structured body arranged for heating of said feed gas, said structured body comprising a macroscopic structure of electrically conductive material;
  a pressure shell housing said structured body, said pressure shell comprising an inlet for letting in said feed gas and an outlet for letting out heated gas, wherein said inlet is positioned so that said feed gas enters said structured body in a first end of said structured body and said heated gas exits said structured body from a second end of said structured body;
  a heat insulation layer between said structured body and said pressure shell;
  at least two conductors electrically connected to said structured body and to an electrical power supply placed outside said pressure shell, wherein said electrical power supply is dimensioned to heat at least part of said structured body to a temperature of at least 400° C. by passing an electrical current through said macroscopic structure, wherein said at least two conductors are connected to the structured body at a position on the structured body closer to said first end of said structured body than to said second end of said structured body, and wherein the structured body is constructed to direct an electrical current to run from one conductor substantially to the second end of the structured body and return to a second of said at least two conductors; and,
  an outlet for heated gas.

Additionally, a process for heating a feed gas in a heating system described herein; said process comprising the steps of:
  pressurizing said feed gas,
  supplying said pressurized feed gas to the heating system,
  supplying electrical power via electrical conductors connecting an electrical power supply placed outside said pressure shell to said structured body, allowing an electrical current to run through said electrically conductive material, thereby heating at least part of the structured body,
  heating the feed gas, and
  outletting a heated gas from the heating system.

Additional aspects of the present technology are set out in the dependent claims, the figures and the following description text.

LEGENDS TO THE FIGURES

DETAILED DISCLOSURE

Specific Embodiments

Figure 1A:
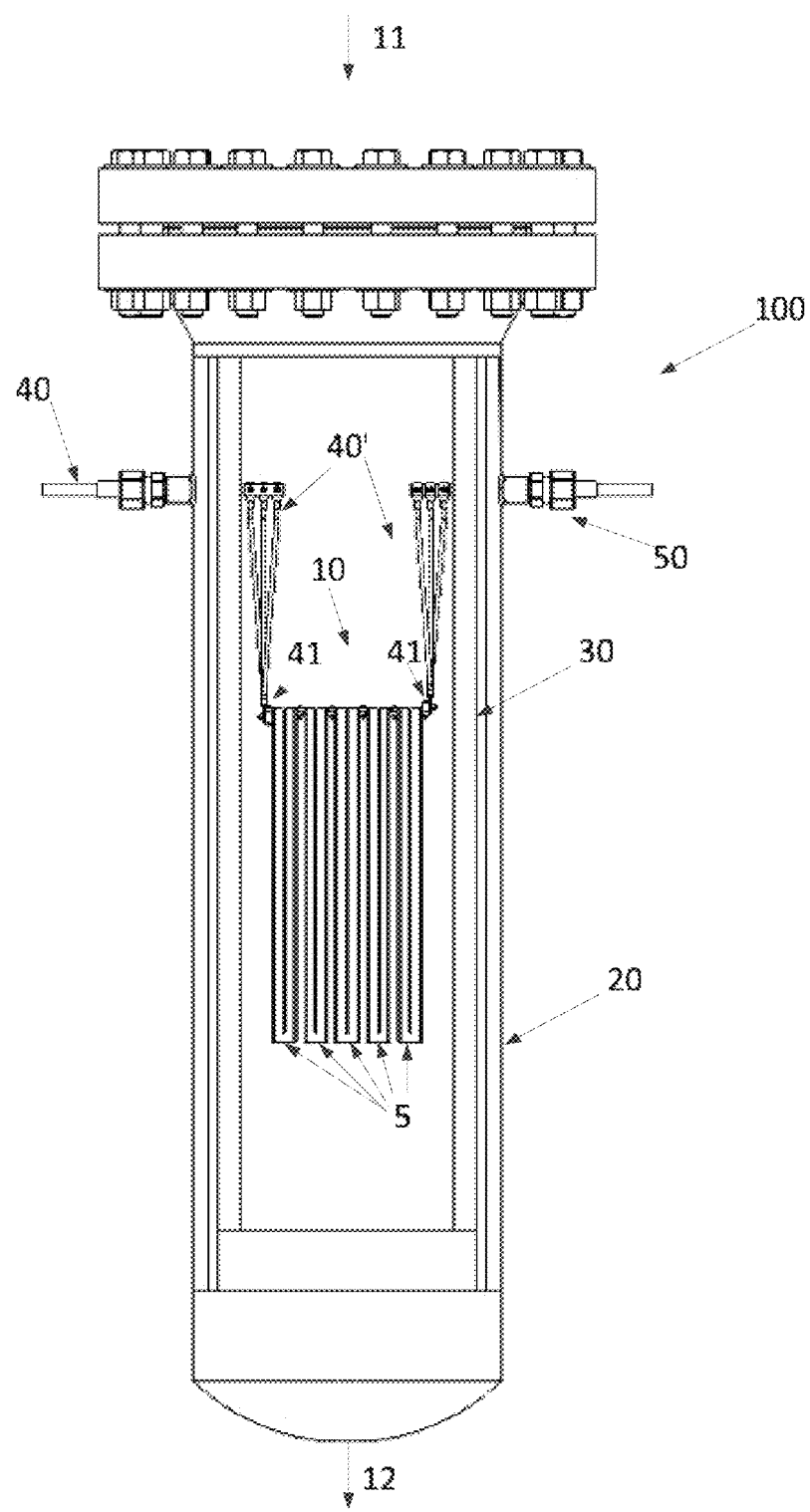
FIG. 1a shows a cross section through an embodiment of the inventive heating system with a structured body comprising an array of macroscopic structures, in a cross section.

The present technology describes how an electrically heated system can facilitate the task of heating gas in a compact design in an on-demand approach.

A compact electric heating system using a structured body can easily be operated and use easy start-up principles when needed. This gives a relative inexpensive plant.

A heating system for heating of a feed gas is thus provided, said heating system comprising:
- a supply of feed gas;
- a structured body arranged for heating of said feed gas, said structured body comprising a macroscopic structure of electrically conductive material;
- a pressure shell housing said structured body, said pressure shell comprising an inlet for letting in said feed gas and an outlet for letting out heated gas, wherein said inlet is positioned so that said feed gas enters said structured body in a first end of said structured body and said heated gas exits said structured body from a second end of said structured body;
- a heat insulation layer between said structured body and said pressure shell;
- at least two conductors electrically connected to said structured body and to an electrical power supply placed outside said pressure shell, wherein said electrical power supply is dimensioned to heat at least part of said structured body to a temperature of at least 400° C. by passing an electrical current through said macroscopic structure, wherein said at least two conductors are connected to the structured body at a position on the structured body closer to said first end of said structured body than to said second end of said structured body, and wherein the structured body is constructed to direct an electrical current to run from one conductor substantially to the second end of the structured body and return to a second of said at least two conductors; and,
- an outlet for a heated gas.

The layout of the heating system allows for feeding a pressurized feed gas to the heating system at an inlet and directing this gas into the pressure shell of the heating system. Inside the pressure shell, a configuration of heat insulation layers and inert material is arranged to direct the feed gas through the structured body. The heated gas from the heated structured body is led to the heating system outlet.

An important feature of the resistance heating process is thus that the energy is supplied inside the object itself, instead of being supplied from an external heat source via heat conduction, convection and radiation. Moreover, the hottest part of the heating system will be within the pressure shell of the heating system. Preferably, the electrical power supply and the structured body are dimensioned so that at least part of the structured body reaches a temperature of at least 700° C., preferably at least 900° C., more preferably at least 1000° C. The surface area of the electrically conductive material, the fraction of the electrically conductive material coated with an—optional—ceramic coating, and the type and structure of the ceramic coating may be tailored to the specific operating conditions.

The heated gas exiting the heating system at the outlet may have substantially the same chemical composition and molar flow rate at the feed gas, as no chemical reaction takes place in the heating system.

In an embodiment the heated gas is selected from the group consisting of $N_2$, $H_2$, $CO_2$, $CH_4$, $H_2O$, $O_2$, and a mixture thereof.

The electrically conductive material is suitably a macroscopic structure. As used herein, the term "macroscopic structure" is meant to denote a structure that is large enough to be visible with the naked eye, without magnifying devices. The dimensions of the macroscopic structure are typically in the range of centimeters or even meters. Dimensions of the macroscopic structure are advantageously made to correspond at least partly to the inner dimensions of the pressure shell housing the structured body, saving room for the heat insulation layer and conductors. Two or more macroscopic structures may be connected in order to provide an array of macroscopic structures having at least one of the outer dimensions in the range of meters, such as 2 m or 5 m. Such two or more macroscopic structures may be denoted "an array of macroscopic structures". In this case the dimensions of an array of macroscopic structures are advantageously made to correspond at least partly to the inner dimension of the pressure shell housing the structured body (saving room for the heat insulation layer). A conceivable array of macroscopic structures could take up a volume of 0.1 to 10 $m^3$ or even larger. The structured body may comprise a single macroscopic structure or an array of macroscopic structures, where the macroscopic structure(s) support(s) an optional ceramic coating. In an array of macroscopic structures, the macroscopic structures may be electrically connected to each other; however, alternatively, the macroscopic structures are not electrically connected to each other. Thus, the structured body may comprise two or more macroscopic structures positioned adjacent to each other. The macroscopic structure(s) may be extruded and sintered structures or 3D printed structures. A 3D printed macroscopic structure can be provided with or without subsequent sintering. In the heating system described herein, the ceramic coating does not support a catalytically active material. The ceramic coating may be applied to maintain a chemical inert environment to thereby limit or even avoid surface reactions on the metal surfaces of the macroscopic structure(s).

The physical dimensions of the macroscopic structure may be any appropriate dimensions; thus, the height may be smaller than the width of the macroscopic structure or vice versa. The macroscopic structure may support a ceramic coating, which can provide a protective layer on the macroscopic structure. The term "macroscopic structure supporting a ceramic coating" is meant to denote that the macroscopic structure is coated by the ceramic coating at, at least, a part of the surface of the macroscopic structure. Thus, the term does not imply that all the surface of the macroscopic structure is coated by the ceramic coating; in particular, at least the parts of the macroscopic structure which are electrically connected to the conductors do not have a coating thereon. The coating is a ceramic material with pores in the structure.

Preferably, the macroscopic structure has been manufactured by extrusion of a mixture of powdered metallic particles and a binder to an extruded structure and subsequent sintering of the extruded structure, thereby providing a material with a high geometric surface area per volume. Preferably, the extruded structure is sintered in a reducing atmosphere to provide the macroscopic structure. Alternatively, the macroscopic structure is 3D printed a metal additive manufacturing melting process, viz. a 3D printing processes, which do not require subsequent sintering, such as powder bed fusion or direct energy deposition processes. Examples of such powder bed fusion or direct energy deposition processes are laser beam, electron beam or plasma 3D printing processes. As another alternative, the macroscopic structure may have been manufactured as a 3D metal structure by means of a binder-based metal additive manufacturing process, and subsequent sintered in a non-oxidizing atmosphere at a first temperature $T_1$, where $T_1 > 1000°$ C., in order to provide the macroscopic structure.

A ceramic coating may be provided onto the macroscopic structure before a second sintering in an oxidizing atmosphere, in order to form chemical bonds between the ceramic coating and the macroscopic structure.

As used herein, the terms "3D print" and "3D printing" is meant to denote a metal additive manufacturing process. Such metal additive manufacturing processes cover 3D printing processes in which material is joined to a structure under computer control to create a three-dimensional object, where the structure is to be solidified, e.g. by sintering, to provide the macroscopic structure. Moreover, such metal additive manufacturing processes cover 3D printing processes, which do not require subsequent sintering, such as powder bed fusion or direct energy deposition processes. Examples of such powder bed fusion or direct energy deposition processes are laser beam, electron beam or plasma 3D printing processes.

The heating system does not need a furnace and this reduces the overall size considerably. The electrically conductive material comprises Fe, Ni, Cu, Co, Cr, Al, Si or an alloy thereof. Such an alloy may comprise further elements, such as Mn, Y, Zr, C, Co, Mo or combinations thereof. Preferably, the electrically conductive material comprises Fe, Cr, Al or an alloy thereof. Such an alloy may comprise further elements, such as Si, Mn, Y, Zr, C, Co, Mo or combinations thereof. Preferably, the conductors and the electrically conductive material are made of different materials than the electrically conductive material. The conductors may for example be of iron, nickel, aluminum, copper, silver or an alloy thereof. The ceramic coating is an electrically insulating material and will typically have a thickness in the range of around 100 μm, say 10-500 μm. The electrically conductive material is advantageously a coherent or consistently intra-connected material in order to achieve electrical conductivity throughout the electrically conductive material, and thereby achieve thermal conductivity throughout the structured body.

By the coherent or consistently intra-connected material it is possible to ensure uniform distribution of current within the electrically conductive material and thus uniform distribution of heat within the structured body. Throughout this text, the term "coherent" is meant to be synonymous to cohesive and thus refer to a material that is consistently intra-connected or consistently coupled. The effect of the structured body being a coherent or consistently intra-connected material is that a control over the connectivity within the material of the structured body and thus the conductivity of the electrically conductive material is obtained. It is to be noted that even if further modifications of the electrically conductive material are carried out, such as provision of slits within parts of the electrically conductive material or the implementation of insulating material within the electrically conductive material, the electrically conductive material is still denoted a coherent or consistently intra-connected material.

The gas flow over the structured body may be axial or co-axial with the current path through the structured body, perpendicular to the current path or have any other appropriate direction in relation to the current path.

The feedstock may be substantially pure streams of steam and a hydrocarbon, alternatively it may be a pure $CO_2$ or pure $H_2$. Also, the feedstock to the heating process may include recycle streams from unit operations downstream the heating system.

In an embodiment, the feed gas may be substantially pure $CO_2$, which is heated to 800° C., or even 1000° C., or even 1200° C. The heated $CO_2$ may after outlet from the heating system be mixed with a hot synthesis gas and equilibrated according to steam methane reforming, methanation and reverse water gas shift reactions in an adiabatic post converter (APOC) for production of CO in a CO rich synthesis gas.

By, the reverse water gas shift reaction is understood:

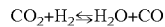

The methanation (and reverse steam reforming) reaction is understood as:

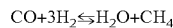

The hot synthesis gas may be provided from any suitable reforming technology, such as a tubular reformer, an autothermal reformer or an electrical reformer.

The use of the adiabatic post convertor (APOC) enables an overall process operation for synthesis gas production at very severe conditions and low steam addition compared to e.g. a stand alone tubular reformer, as carbon limits in this way can be partly circumvented, which otherwise will pose process limitations on the said reactor system.

By CO rich synthesis gas stream is understood a gas stream with a relative high amount of CO. In an embodiment the CO rich synthesis gas comprises a gas mixture of a $H_2/CO$ ratio below 3, such as preferably below 2, or even below 1.

In an embodiment, the feed gas is a mixture of different gasses, such as $N_2$ and $H_2$.

In an embodiment, the heated feed gas comprising $N_2$ and $H_2$ may be used to reduce an ammonia catalyst e.g. in a subsequent ammonia synthesis reactor. The heated feed gas comprising $N_2$ and $H_2$ may be heated to 500° C.

In another embodiment the heated gas comprises pure $H_2$. Such a heated gas may be used to reduce a nickel catalyst in e.g. a steam reformer and thus heated to at least 700° C. in the heating system.

In a different embodiment the heated gas comprises substantially pure steam. The steam may be heated to a temperature of from 800 to 850° C. and used as feedstock to a solid oxide electrolysis cell (SOEC) for electrolysis. In this configuration the SOEC can be used to produce $H_2$ from the steam when an electric potential is applied to the SOEC.

In a similar embodiment the heating system may be used to heat pure $CO_2$. The $CO_2$ may be used as a feed to an SOEC. In this configuration the SOEC can be used to produce CO from the $CO_2$ when an electric potential is applied to the SOEC.

The term "electrically conductive" is meant to denote materials with an electrical resistivity in the range from: $10^{-5}$ to $10^{-8}$ Ω·m at 20° C. Thus, materials that are electrically conductive are e.g. metals like copper, silver, aluminum, chromium, iron, nickel, or alloys of metals. Moreover, the term "electrically insulating" is meant to denote materials with an electrical resistivity above 10 Ω·m at 20° C., e.g. in the range from $10^9$ to $10^{25}$ Ω·m at 20° C.

When the heating system comprises a heat insulation layer between the structured body and the pressure shell, appropriate heat and electrical insulation between the structured body and the pressure shell is obtained. The presence of heat insulating layer between the pressure shell and the structured body assists in avoiding excessive heating of the pressure shell, and assists in reducing thermal losses to the surroundings. The temperatures of the structured body may reach up to about 1300° C., at least at some parts thereof, but by using the heat insulation layer between the structured body and the pressure shell the temperature of the pressure shell can be kept at significantly lower temperatures of say 500° C. or even 100° C., which is advantageous as typical construction steel materials typically are unsuitable for pressure bearing application at temperatures above 1000° C. Moreover, a heat insulating layer between the pressure shell and the structured body assists in control of the electrical current within the heating system, since heat insulation layer is also electrically insulating. The heat insulation layer could be one or more layers of solid material, such as ceramics, inert material, fiber material, bricks or a gas barrier or a combination thereof. Thus, it is also conceivable that a purge gas or a confined gas constitutes or forms part of the heat insulation layer.

Moreover, it should be noted that the term "heat insulating material" is meant to denote materials having a thermal conductivity of about 10 W·m$^{-1}$·K$^{-1}$ or below. Examples of heat insulating materials are ceramics, bricks, alumina based materials, zirconia based materials and similar.

Advantageously, any relevant gaps between structured body, the heat insulation layer, the pressure shell, and/or any other components inside the heating system is filled with inert material, e.g. in the form of inert pellets. Such gaps are e.g. a gap between the lower side of the structured body and the bottom of the pressure shell and a gap between the sides of the structured body and the insulation layer covering the inner sides of the pressure shell. The inert material may e.g. be a ceramic material in the form of pellets or tiles. The inert material assists in controlling the gas distribution through the heating system and in controlling the flow of the gas through the structured body. Moreover, the inert material typically has a heat insulating effect.

The pressure shell suitably has a design pressure of between 2 bar and 30 bar. The actual operating pressure will be determined by the size of the plants, among other aspects. As the hottest part of the heating system is the electrically conductive material, which will be surrounded by heat insulation layer and within the pressure shell of the heating system, the temperature of the pressure shell can be kept significantly lower than the maximum process temperature. This allows for having a relative low design temperature of the pressure shell of e.g. 700° C. or 500° C. or preferably 300° C. or 100° C. of the pressure shell whilst having maximum process temperatures of 400° C., or even 900, or even 1100° C., or even up to 1300° C. on the structured body. Material strength is higher at the lower of these temperatures (corresponding to the design temperature of the pressure shell as indicated above). This offers advantages when designing the heating system. Suitably, the pressure shell has a design pressure of between 2 bar and 30 bar, or between 30 and 200 bar. Around 30 bar is preferable as a compromise between process economy and thermodynamic limitations.

The resistivity of the electrically conductive material is suitably between $10^{-5}$ Ω·m and $10^{-7}$ Ω·m. A material with a resistivity within this range provides for an efficient heating of the structured body when energized with a power source. Graphite has a resistivity of about $10^{-5}$ Ω·m at 20° C., kanthal has a resistivity of about $10^{-6}$ Ω·m at 20° C., whilst stainless steel has a resistivity of about $10^{-7}$ Ω·m at 20° C. The electrically conductive material may for example be made of FeCrAlloy having a resistivity of ca. $1.5 \cdot 10^{-6}$ Ω·m at 20° C.

Typically, the pressure shell comprises an inlet for letting in process gas and an outlet for letting out heated gas, wherein the inlet is positioned close to a first end of the pressure shell and the outlet is positioned close to a second end of the pressure shell, and wherein the at least two conductors both are connected to the structured body at a position on the structured body closer to the inlet than to the outlet. Hereby, the at least two conductors can be placed in the substantially colder part of the heating system as the inlet gas will have lower temperature than the product gas, the electrically conductive material will be colder in the most upstream part of the material due to the heat consumed by the progress of the heating, and the feed gas fed through the inlet may cool the at least two conductors before being heated by the heated structured body further along the path of the gas over the heated structured body. It is an advantage that the temperature of all electrically conducting elements except the electrically conductive material is kept down in order to protect the connections between the conductors and the structured body. When the temperature of the conductors and other electrically conducting elements, except the electrically conductive material, is relatively low, less limitations on materials suitable for the conductors and other electrically conducting elements, except the electrically conductive material, exists. When the temperature of the electrically conducting elements increase, the resistivity thereof increases; therefore, it is desirable to avoid unnecessary heating of all other parts than the electrically conductive materials within the heating system. The term "electrically conducting elements, except the electrically conductive material" is meant to cover the relevant electrically conducting elements arranged to connect the power supply to the structured body, except the electrically conductive structured body itself.

It should be noted, that the system of the invention may include any appropriate number of power supplies and any appropriate number of conductors connecting the power supply/supplies and the electrically conductive material(s) of the structured body.

Suitably, the at least two conductors are led through a pressure shell in a fitting so that the at least two conductors are electrically insulated from the pressure shell. The fitting may be, partly, of a plastic and/or ceramic material. The term "fitting" is meant to denote a device that allows for mechanically connecting two pieces of hardware in a pressure bearing configuration. Thereby, the pressure within the pressure shell may be maintained even though the at least two conductors are lead through it. Non-limiting examples of the fittings may be an electrically insulating fitting, a dielectric fitting, a power compression seal, a compression fitting or a flange. The pressure shell typically comprises side walls, end walls, flanges and possibly further parts. The term "pressure shell" is meant to cover any of these components.

The connection between the structured body and the at least two conductors may be a mechanical connection, a welded connection, a brazed connection or a combination thereof. The structured body may comprise terminals physically and electrically connected to the structured body in order to facilitate the electrical connection between the electrically conductive material and the at least two conductors. The term "mechanical connection" is meant to denote a connection where two components are held together mechanically, such as by a threaded connection or by clamping, so that a current may run between the components.

The electrically conductive materials placed in an array of electrically conductive materials may be electrically connected to each other. The connection between the two or more electrically conductive materials may be by mechanical connection, clamping, soldering, welding or any combination of these connection methods. Each electrically conductive material may comprise terminals in order to facilitate the electrical connections. The two or more electrically conductive materials may be connected to the power supply in serial or parallel connection. The electrical connection between the two or more electrically conductive materials is advantageously coherent and uniform along the connection surface between the two or more electrically conductive materials, so that the two or more electrically conductive materials act as a single coherent or consistently intra-connected material; hereby, uniform electrical conductivity throughout the two or more electrically conductive materials is facilitated. Alternatively, or additionally, the structured body may comprise an array of electrically conductive materials that are not electrically connected to each other. Instead, two or more electrically conductive materials are placed together within the pressure shell, but not connected electrically to each other. In this case, the structured body thus comprises electrically conductive materials connected in parallel to the power supply.

A ceramic coating may be added directly to a metal surface of the electrically conductive material by wash coating. The wash coating of a metal surface is a well-known process; a description is given in e.g. Cybulski, A., and Moulijn, J. A., "Structured bodys and reactors", Marcel Dekker, Inc, New York, 1998, Chapter 3, and references herein. The ceramic coating may for example be an oxide comprising Al, Zr, Mg, Ce and/or Ca. Exemplary coatings are calcium aluminate or a magnesium aluminum spinel. Such a ceramic coating may comprise further elements, such as La, Y, Ti, K or combinations thereof. The ceramic coating is an electrically insulating material and will typically have a thickness in the range of around 100 μm, say 10-500 μm.

Extruding and sintering or 3D printing a macroscopic structure results in a uniformly and coherently shaped macroscopic structure, which can afterwards be coated with the ceramic coating.

The electrically conductive material and the ceramic coating may have been sintered in an oxidizing atmosphere in order to form chemical bonds between the ceramic coating and the electrically conductive material; this provides for an especially high heat conductivity between the electrically conductive material and the ceramic coating. Thereby, the structured body is compact in terms of heat transfer, and a heating system housing the structured body may be compact and limited mainly by the rate of the heating.

In an embodiment, the structured body has at least one electrically insulating part arranged to increase the current path between the conductors to a length larger than the largest dimension of the structured body. The provision of a current path between the conductors larger than the largest dimension of the structured body may be by provision of electrically insulating part(s) positioned between the conductors and preventing the current running through some part of the structured body. Such electrically insulating parts are arranged to increase the current path and thus increase the resistance through the structured body. Hereby, the current path through the structured body can be e.g. more than 50%, 100%, 200%, 1000%, or even 10000% longer than the largest dimension of the structured body.

Moreover, such electrically insulating parts are arranged to direct the current from one conductor, which is closer to the first end of the structured body than to the second end, towards the second end of the structured body and back to a second conductor closer to the first end of the structured body than to the second end. Preferably, the current is arranged to run from the first end of the structured body to the second and back to the first end. As seen in the figures, the first end of the structured body is the top end thereof. The arrow indicated "z" in FIGS. 5-7 indicates a z-axis along the length of the structured body. The principal current path throughout the structured body will have a positive or negative value of z-coordinate of the accompanied current density vector along most of the length of the current path. By principal current path is meant the path of the electrons through a macroscopic structure of the structured body with the highest current density. The principal current path can also be understood as the path having the minimum length through the macroscopic structure of the structured body. Seen geometrically, the principal current path can be quantified as the largest current density vector within a plane perpendicular to the gas flow direction of a coherent section of the macroscopic structure. At the bottom of the structured body, as shown in the figures, the current will turn, and here the z-coordinate of the accompanied current density vector will be zero.

As used herein, the term coherent section is meant to denote a cross-section area of the macroscopic structure wherein all walls of the coherent section are geometrically connected to one or more other walls of the coherent section within the same plane.

In an embodiment, the structured body has at least one electrically insulating part arranged to direct a current through the structured body in order to ensure that for at least 70% of the length of said structured body, a current density vector of a principal current path has a non-zero component value parallel to the length of said structured body. Thus, for at least 70% of the length of the structured body, the current density vector will have a positive or negative component value parallel to the length of the structured body. Thus, for at least 70%, e.g. for 90% or 95%, of the length of structured body, viz. along the z-axis of the structured body as seen in FIGS. 5 to 10, the current density vector of a principal current path will have a positive or negative value along the z-axis. This means that the current is forced from the first end of the structured body towards the second end, and subsequently is forced towards the first end again. The gas entering the first end of the structured body absorbs heat from the structured body. For this reason, the first end of the structured body remains colder than the second end, and by ensuring that the current density vector of the principal current path has a non-zero component value parallel to the length of said structured body, this takes place with a substantially continuously increasing temperature profile, which gives a controllable reaction front. In an embodiment the current density vector has a non-zero component value parallel to the length of said structured body in 70% of the length of said structured body, preferably 80%, more preferably 90%, and even more preferably 95%. It should be noted that the term "the length of the structured body" is meant to denote the dimension of the structured body in the direction of the gas flow. In the structured bodies as shown in the figures, the length is the longitudinal direction, viz. the longest dimension thereof. This is indicated by the arrow denote z in some of the figures.

Non-limiting examples of insulating parts are cuts, slits, or holes in the structure. Optionally, a solid insulating material such as ceramics in cuts or slits in the structure can be used. A solid insulating material within a cut or slit assists in keeping the parts of the structured body on the sides of the cut or slit from each other. As used herein, the term "largest dimension of the structured body" is meant to denote the largest inner dimension of the geometrical form taken up by the structured body. If the structured body is box-formed, the largest dimension would be the diagonal from one corner to the farthest corner, also denoted the space diagonal.

It should be noted that even though the current through the structured body may be arranged to twist or wind its way through the structured body due to the electrically insulating parts arranged to increase the current path, the gas passing through the heating system is inlet at one end of the heating system, passes over the structured body once before being outlet from the heating system. Inert material is advantageously present in relevant gaps between the structured body and the rest of the heating system to ensure that the gas within the heating system passes over the structured body.

The length of the gas passage through the structured body is suitably less than the length of the passage of current from one electrode through the structured body and to the next electrode. The ratio of the length of the gas passage to the length of the current passage may be less than 0.6, or 0.3, 0.1, or even down to 0.002.

Typically, the structured body has electrically insulating parts arranged to make the current path through the structured body a zigzag path. Here, the terms "zigzag path" and "zigzag route" is meant to denote a path that has corners at variable angles tracing a path from one conductor to another. A zigzag path is for example a path going upwards, turning, and subsequently going downwards. A zigzag path may have many turns, going upwards and subsequently downwards many times through the structured body, even though one turn is enough to make the path a zigzag path.

It should be noted that the insulating parts arranged to increase the current path are not necessarily related to the ceramic coating on the electrically conductive material; even though this ceramic coating is also considered electrically insulating, it does not change the length of the current path between the conductors connected to the electrically conductive material.

The macroscopic structure may have a plurality of parallel channels, a plurality of non-parallel channels and/or a plurality of labyrinthine channels, where the channels have walls defining the channels. Thereby, several different forms of the macroscopic structure can be used as long as the surface area of the structured body exposed to the gas is as large as possible. In a preferred embodiment, the macroscopic structure has parallel channels, since such parallel channels render a structured body with a very small pressure drop. In a preferred embodiment, parallel longitudinal channels are skewed in the longitudinal direction of the macroscopic structure. In this way, molecules of the gas flowing through the macroscopic structure will mostly tend to hit a wall inside the channels instead of just flowing straight through a channel without being in contact with a wall. The dimension of the channels should be appropriate in order to provide a macroscopic structure with a sufficient resistivity. For example, the channels could be quadratic (as seen in cross section perpendicular to the channels) and have a side length of the squares of between 1 and 3 mm; however, channels having a maximum extent in the cross section of up to about 4 cm are conceivable. The walls may e.g. have a thickness of between 0.2 and 2 mm, such as about 0.5 mm, and the ceramic coating supported by the walls has a thickness of between 10 μm and 500 μm, such as between 50 μm and 200 μm, such as 100 μm. In another embodiment, the macroscopic structure of the structured body is cross-corrugated.

In general, when the macroscopic structure is extruded or 3D printed, the pressure drop from the inlet to the outlet of the heating system may be reduced considerably compared to a heating system where the catalyst material is in the form of pellets.

The geometric surface area of the macroscopic structure may be between 100 and 3000 $m^2/m^3$, such as between 500 and 1100 $m^2/m^3$. Typically, the material of the macroscopic structure is chosen as a material arranged to supply a heat flux of 500 $W/m^2$ to 50000 $W/m^2$ by resistance heating of the material. Preferably, resistance heating of the material supplies a heat flux of between 5 $kW/m^2$ and 12 $kW/m^2$, for example between 8 $kW/m^2$ and 10 $kW/m^2$. The heat flux is given as heat per geometric surface area of the surface exposed to the gas.

The predetermined temperature range of the gas exiting the pressure shell/the heating system is the range from 200 to 1300° C. The heated gas outlet temperature from the structured body is measured directly beneath or on the most downstream surface of the structured body. Measuring technology can be thermocouples (by voltage drop), resistance temperature detectors or infrared detection. The measuring point can be separated from the structured body and be embedded in downstream inert, or be directly on the surface with an insulating surface coverage.

The structured body within said heating system suitably has a ratio between the area equivalent diameter of a horizontal cross section through the structured body and the height of the structured body in the range from 0.1 to 2.0. The area equivalent diameter of the cross section through the heating system is defined as the diameter of a circle of equivalent area as the area of the cross section. When the ratio between the area equivalent diameter and the height of the structured body is between 0.1 and 2.0, the pressure shell housing the structured body may be relatively small compared to other heating systems.

Typically, the gas flows through the heating system in an upflow or downflow direction, so that the gas flows through channels in the structured body along the height thereof. When the structured body comprises a number of or an array of macroscopic structures, the individual macroscopic structures within the array may be placed side by side, on top of each other or in a combination thereof. It is stressed that, when the structured body comprises more than one macroscopic structures, the dimensions of the structured body are the dimensions of the more than one macroscopic structures. Thus, as an example, if the structured body comprises two macroscopic structures, each having the height h, put on top of each other, the height of the structured body is 2 h.

The volume of the structured body is chosen in consideration of the desired temperature out of the heating system correlated to the heat generation capacity of the electrically conductive material.

Suitably, the height of the heating system is between 0.5 and 7 m, more preferably between 0.5 and 3 m. Exemplary values of the height of the heating system is a height of less than 5 meters, preferably less than 2 m or even 1 m. The dimensions of the heating system and of the structured body within the heating system are correlated; of course, the pressure shell and heat insulation layer render the heating system somewhat larger than the structured body itself.

The heating system described above is not a segregated system. As heating is not transferred across a pressure bearing wall, the risk of mechanical failure is not high. This means that start-up is fast in comparison and in practice the current invention can be started by applying a given voltage and then the system will work towards a thermal equilibration to reach steady state without any additional operator input.

A process for heating a feed gas in a heating system described herein;

The process comprises the steps of:
pressurizing said feed gas,
supplying said pressurized feed gas to the heating system,
supplying electrical power via electrical conductors connecting an electrical power supply placed outside said pressure shell to said structured body, allowing an electrical current to run through said electrically conductive material, thereby heating at least part of the structured body,
heating the feed gas; and
outletting heated gas from the heating system.

All details of the system given above are—wherever possible—relevant to the process described above.

In one aspect, the feed gas is pressurised to a pressure between 2 and 30 bar. The feed gas may be pressurised to a pressure between 30 and 200 bar. Suitably, at least part of the structured body is heated to a temperature of at least 700° C., preferably at least 900° C., more preferably at least 1000° C. The maximum temperature to which the structured body is heated is ca. 1400° C.

A method for rapidly switching heating of a feed gas in a heating system as set out herein, from a first steady-state heating condition (A) to a second steady-state heating condition (B) or vice-versa, is therefore provided.

Reaching a steady state condition is defined as when central process parameters (such as feed flow and outlet temperature) have reached a value within ±15% of the average process value for the given process parameter for the subsequent hour.

A condition of the invention, A or B, involves a state where the system is heated by an electrical power balanced to heat the gas outlet temperature from the structured body to a temperature between 300 and 1300° C. at a pressure between 5 barg and 150 barg with a feedstock in a total flow rate of 300 $Nm^3/h$ to 100 000 $Nm^3/h$.

The term "vice versa" is used to mean that the method applies equally when switching from the first heating condition (A) to the second heating condition (B) as when switching from the second heating condition (B) to the first heating condition (A). Notably, a switch from condition A to B is considered completed when the process values of the system have reached within 85% of steady state conditions.

The heating system is as described above; i.e. it comprises a pressure shell housing a structured body arranged to facilitate the heating of a feed gas, said structured body comprising a macroscopic structure of an electrically conductive material, said macroscopic structure supporting a ceramic coating, and wherein said heating system is provided with heat insulation between said structured body and said pressure shell. All details described above in relation to the heating system are relevant for the present technology.

The method of this aspect of the invention comprises the steps of:
in said first steady-state heating condition (A):
supplying said feed gas to the heating system in a first total flow, and
supplying a first electrical power via electrical conductors connecting an electrical power supply placed outside said pressure shell to said structured body, thereby allowing a first electrical current to run through said electrically conductive material,
thereby heating at least part of the structured body to a first temperature at which said feed gas is heated over said structured body under said first steady-state heating conditions (A); and said first heated gas is outlet from the heating system;

and, in said second steady-state heating condition (B):
supplying said feed gas to the heating system in a second total flow,
supplying a second electrical power via electrical conductors connecting an electrical power supply placed outside said pressure shell to said structured body, thereby allowing a second electrical current to run through said electrically conductive material, thereby heating at least part of the structured body to a second temperature; at which said feed gas heated over said structured body under said second steady-state heating conditions (B); and said second heated gas is outlet from the heating system.

To achieve the first and second steady-state heating conditions (A) and (B), the second electrical power is higher than said first electrical power; and/or said second total flow is higher than said first total flow.

Notably, an increase in total flow will increase the input of cool feed gas, thus cooling the structured body, and reducing the reactivity so that second steady-state heating condition (B) is achieved. A significant change in flow will change the energy required for the process.

A change in total flow may include a change in total flow with no compositional change or a change in the composition, such as increasing recycle flow or changing part of the feedstock.

In one embodiment, the ratio of total gas feed flow in said first heating condition A to said second heating condition B (A:B) is at least 1:10. Switching between condition A and B consequently allows for significant increased/decreased production of heated gas. This is advantageous when the invention is used for e.g. energy storage where excess electric energy from the energy grid is available and in this way can be stored as chemical energy, or vice versa for increasing availability of electric energy in the grid when it is needed elsewhere. Additionally, the embodiment allows for using the invention to supply large amounts of heated gas in periods where downstream processes demands it, while having the invention operating in a standby condition otherwise. This is advantageously if there is no continuous demand for the heated gas.

In another embodiment, the heated gas outlet temperature from the structured body in heating condition B is between 50° C. to 800° C. higher, such as between 100° C. to 500° C. higher, preferably between 150° C. to 400° C. higher, than the heated gas outlet temperature from the structured body in heating condition A. This allows for rapidly starting up the heating system from a cold state to operating conditions. This is advantageously in the situation of system start-up, where the start-up procedure involves steps including:

Heating process equipment in a non-condensing gas to a temperature above the condensation point of the steady state conditions of the plant at full operating capacity,
Pressurising the feed gas constituents,
Feeding feed gas constituents to the heating system while applying a first electrical power,
Switching to a higher operating temperature by applying a second electrical power.

In this way, all steps of the start-up procedure are relatively fast.

The heated gas outlet temperature from the structured body in heating condition B is typically no more than 50° C. higher than the heated gas outlet temperature from the structured body in heating condition A. This allows for rapidly changing the between condition A and B. In this way, the demand for the heated gas for downstream processes of the heating system can easily be supplied in different quantities without interfering significantly in the chemical environment of these.

In one embodiment, the switch between heating condition A and B includes a gradual change of the total gas feed flow from said first total flow to said second total flow and simultaneous gradual change of the applied electrical potential over said electrically conductive material from said first to said second electrical power. In this way, the heated gas composition can be held almost constant also during the transition stage. In an embodiment, the gradual changes are made in such a way where the flow is increased in small steps while increasing the electrical power to maintain an almost constant heated gas outlet temperature from the structured body.

In an embodiment the structured body comprises a first part arranged to generate a first heat flux and a second part arranged to generate a second heat flux, where the first heat flux is lower than the second heat flux, and where the first part is upstream the second part. Here, the term "the first part is upstream the second part" is meant to denote, that the gas fed into the heating system reaches the first part before the gas reaches the second part. The first part and second part of the structured body may be two different macroscopic structures supporting ceramic coating, where the two different macroscopic structures may be arranged to generate different heat fluxes for a given electrical current and voltage. For instance, the first part of the structured body may have a large surface area, whilst the second part of the structured body has a smaller surface area. This may be accomplished by providing a structured body in the second part having a smaller cross sectional area than the cross sectional area of the first part. Alternatively, the current path through the first part of the structured body may be more straight than the current path through the second part of the structured body, thus making the current twist and wind more through the second part than through the first part of the structured body, whereby the current generates more heat in the second part of the structured body than in the first part. As mentioned before, slits or cuts in the macroscopic structure may make the current path zigzag through the macroscopic structure. It should be noted, that the first and second part of the structured body may experience different electrical currents and voltages in order to be able to supply different heat fluxes. However, the different heat fluxes of the first and second part may also be achieved by supplying the same electrical current and voltage through/over the first and second part, due to different physical properties of the first and second part as indicated above. In a further embodiment, the structured body comprises a third part arranged to generate a third heat flux, where the third heat flux is lower than the first and/or the second heat flux, and where the third part is downstream the first and/or second part.

In an embodiment, the heating system further comprises a control system arranged to control the electrical power supply to ensure that the temperature of the gas exiting the pressure shell lies in a predetermined range. The control of the electrical power supply is the control of the electrical output from the power supply. The control of the electrical power supply may e.g. be carried out as a control of the voltage and/or current from the electrical power supply, as a control of whether the electrical power supply is turned on or off or as a combination hereof. The power supplied to the structured body can be in the form of alternating current or direct current.

According to one embodiment, a proportional-integral-derivative (PID) controller controls the electrical potential based on feedback reading of the process value of heated gas outlet temperature from the structured body.

The method described herein allows rapid switching between conditions A and B. Suitably, therefore, the switch between heating conditions A and B takes place over a period of less than 3 hours, such as less than 2 hours, such as less than 60 min, preferably less than 30 min, and even more preferably less than 15 min.

In one embodiment, the switch between heating condition A and B involves supplying a second electrical power to the structured body. This suitably occurs while keeping the total flow essentially constant.

In one aspect, the switch between heating condition A and B comprises a transition state between said heating conditions A and B; said transition state comprising a first period in which the electrical power is switched off, followed by a second period in which said second electrical power of condition B is supplied to the structured body. This allows for faster establishment of a steady state.

In one aspect, the switch between heating condition A and B comprises a transition state between said heating conditions A and B; said transition state comprising a first period in which a third electrical power is supplied to the structured body, followed by a second period in which said second electrical power of condition B is supplied to the structured body, said third electrical power being higher than the second electrical power. This allows for faster establishment of a steady state.

The process may comprise further steps carried out on the product gas, such as purification, pressurization, additional heating, cooling, etc. to provide the final heated gas for an application downstream the heating system of this invention.

It should be noted that the feed gas may comprises individual feed gasses and that the step of pressurizing the feed gas may comprise pressurizing individual feed gasses individually. Moreover, it should be noted that the order in which the steps of the process are written are not necessarily the order in which the process steps take place, in that two or more steps may take place simultaneously, or the order may be different that indicated above.

In an embodiment, the process comprises the step of pressurizing the gas upstream the pressure shell to a pressure of up to at least 2 bar. The chosen operating pressure is defined by the integration of the heated in the surrounding process steps.

In an embodiment of the process according to the invention, the temperature of the feed gas let into the heating system is between 100° C. and 700° C., preferably between 100 and 300° C. However, in all embodiments the temperature and the pressure of the feed gas are adjusted to ensure that the feed gas is above the dew point.

In an embodiment of the process of the invention, the structured body is heated so that the maximum temperature of the structured body lies between 200° C. and 1300° C. The maximum temperature of the structured body depends upon the material of the electrically conductive material; thus, if the electrically conductive material is of FeCrAlloy, which melts at a temperature of between 1380° C. and 1490° C. (depending on the actual alloy), the maximum temperature should be somewhat below the melting point, such as at about 1300° C. if the melting point of the electrically conductive material is at about 1400° C., as the material will become soft and ductile when approaching the melting point. The maximum temperature may additionally be limited by the durability of the coating.

The ceramic coating may be $Al_2O_3$, $ZrO_2$, $MgAl_2O_3$, $CaAl_2O_3$, or a combination therefore and potentially mixed with oxides of Y, Ti, La, or Ce. The maximum temperature of the heating system may be between 850-1300° C. The pressure of the feed gas may be 2-180 bar, preferably about 35 bar. In an embodiment said macroscopic structure is made of an alloy of Fe Cr Al, supporting a ceramic coating of a $ZrO_2$ and $Al_2O_3$ mixture.

DETAILED DESCRIPTION OF THE FIGURES

Throughout the Figures, like reference numbers denote like elements.

FIG. 1a shows a cross section through an embodiment of a heating system 100 according to the invention. The heating system 100 comprises a structured body 10, arranged as an array of macroscopic structures 5. Each macroscopic structure 5 in the array is coated with a ceramic coating. The heating system 100 moreover comprises conductors 40, 40' connected to a power supply (not shown in the Figures) and to the structured body 10, viz. the array of macroscopic structures. The conductors 40, 40' are led through the wall of a pressure shell 20 housing the structured body and through insulating material 30 on the inner side of the pressure shell, via fittings 50. The conductors 40' are connected to the array of macroscopic structures 5 by conductor contact rails 41.

In an embodiment, the electrical power supply supplies a voltage of 26V and a current of 1200 A. In another embodiment, the electrical power supply supplies a voltage of 5V and a current of 240 A. The current is led through electrical conductors 40, 40' to conductor contact rails 41, and the current runs through the structured body 10 from one conductor contact rail 41, e.g. from the conductor contact rail seen to the left in FIG. 1a, to the other conductor contact rail 41, e.g. the conductor contact rail seen to the right in FIG. 1a. The current can be both alternating current, and e.g. run alternating in both directions, or direct current and run in any of the two directions.

The macroscopic structures 5 are made of electrically conductive material. Especially preferred is the alloy kanthal consisting of aluminum, iron and chrome. The ceramic coating, is e.g. an oxide, coated onto the structured body 5. The conductors 40, 40' are made in materials like iron, aluminum, nickel, copper or alloys thereof.

During operating, a feed gas enters the heating system 100 from above as indicated by the arrow 11. Heated gas exits the heating system from the bottom thereof as indicated by the arrow 12.

Figure 1B:
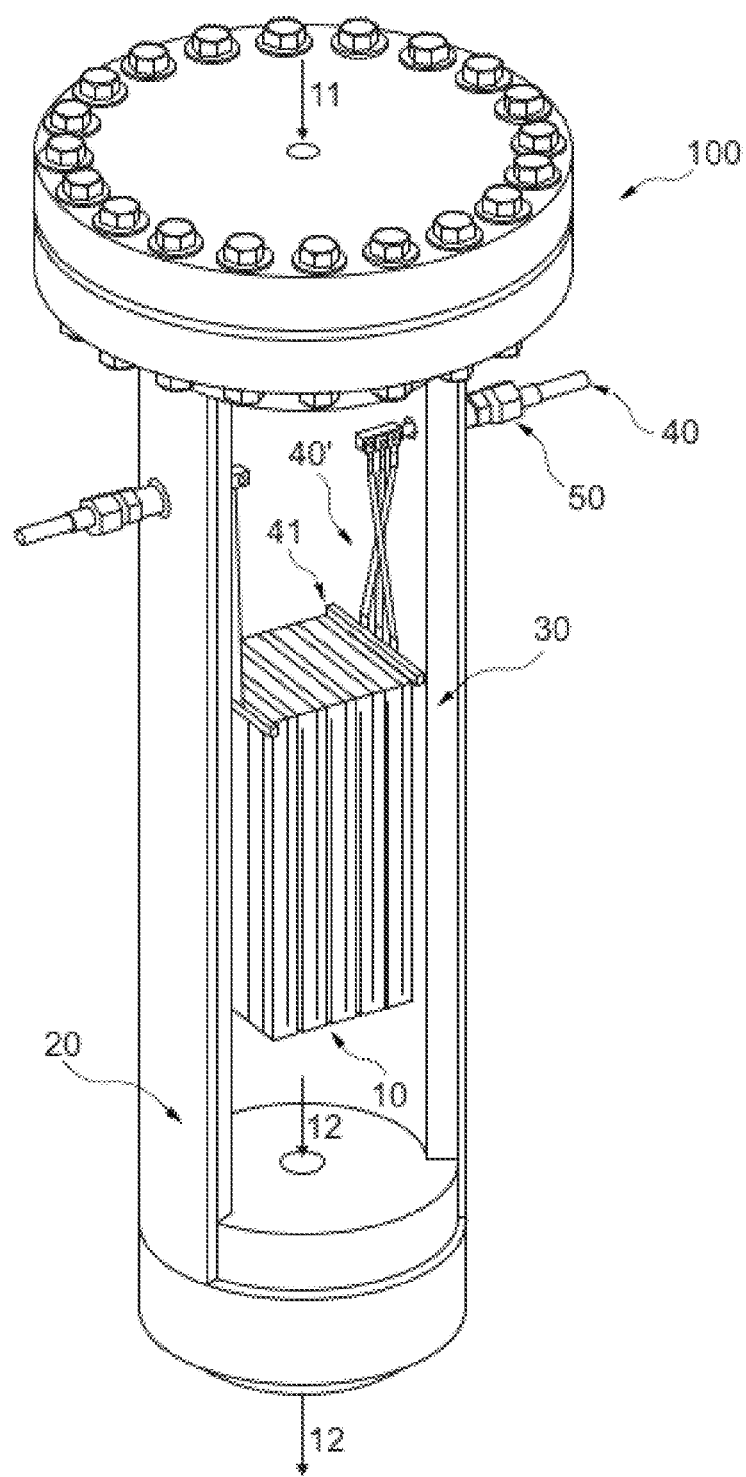
FIG. 1b shows the heating system of FIG. 1a with a part of the pressure shell and heat insulation layer removed.
Figure 2:
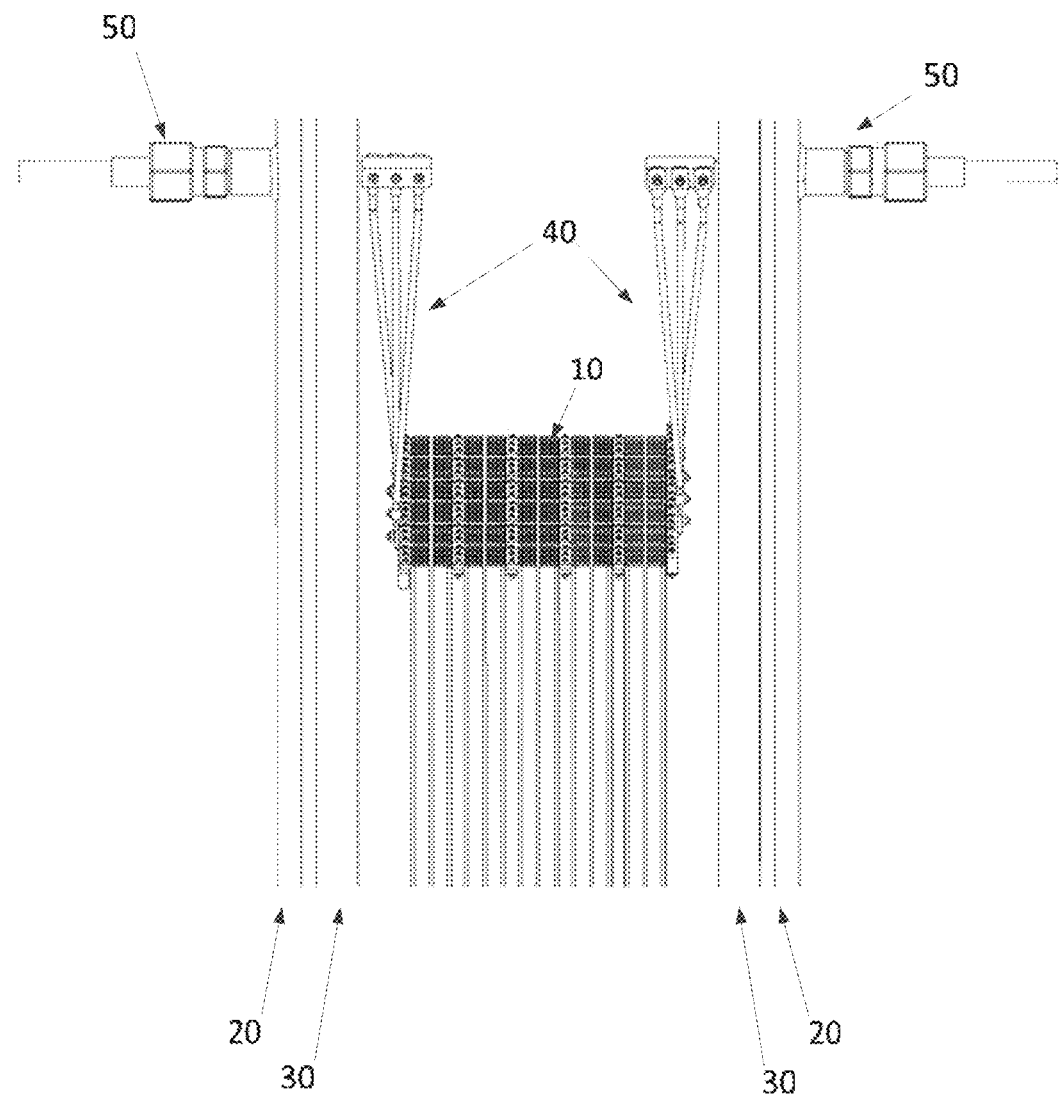
FIG. 2 is an enlarged view of a part of the heating system.

FIG. 1b shows the heating system 100 of FIG. 1a with a part of the pressure shell 20 and heat insulation 30 layer removed and FIG. 2 is an enlarged view of a part of the heating system 100. In FIGS. 1b and 2 the connections between conductors 40' and conductor contact rails 41 are shown more clearly than in FIG. 1a. Moreover, it is seen that the conductors 40 are led through the walls of the pressure shell in a fitting 50, and that the one conductor 40 is split up into three conductors 40' within the pressure shell. It should be noted, that the number of conductors 40' may be any appropriate number, such as smaller than three or even larger than three.

In the heating system shown in FIGS. 1a, 1b and 2, the conductors 40, 40' are led through the wall of a pressure shell 20 housing the structured body and through insulating material 30 on the inner side of the pressure shell, via fittings 50. Feed gas is inlet into the heating system 100 via an inlet in the upper side of the heating system 100 as shown by the arrow 11, and heated gas exits the heating system 100 via an outlet in the bottom of the heating system 100 as shown by the arrow 12.

In the heating system 100 shown in FIGS. 1a to 2, inert material (not shown in FIGS. 1a-2) is advantageously present between the lower side of the structured body 10 and the bottom of the pressure shell. Moreover, inert material is advantageously present between the outer sides of the structured body 10 of macroscopic structures 5 and the insulating material 30. Thus, one side of the insulating material 30 faces the inner side of the pressure shell 20 and the other side of the insulating material 30 faces the inert material. The inert materiel is e.g. ceramic material and may be in the form of pellets. The inert material assists in controlling the pressure drop across the heating system 100 and in controlling the flow of the gas through the heating system 100, so that the gas flows over the surfaces of the structured body 10.

Figure 3:
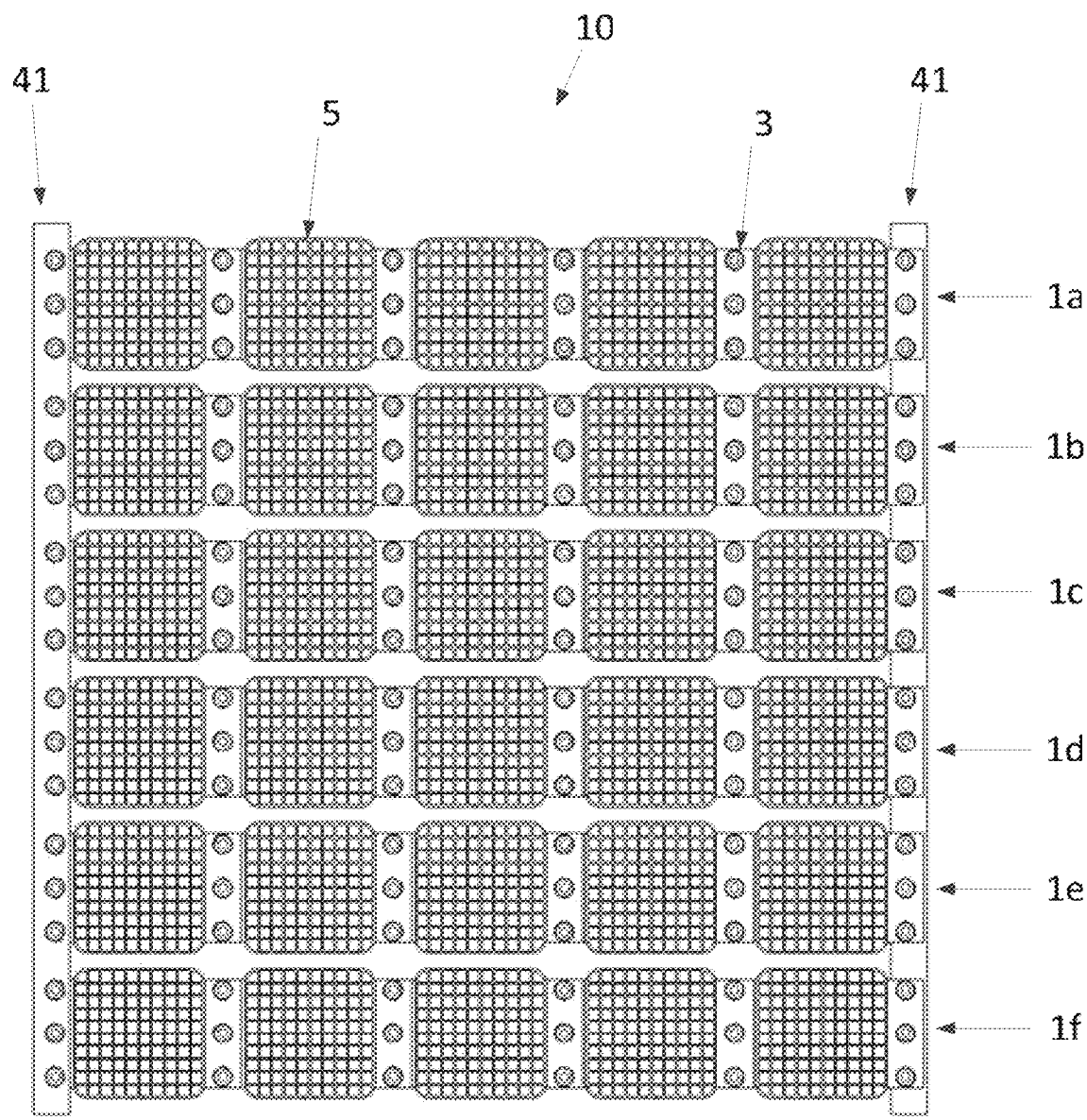
FIGS. 3 and 4 show an embodiment of a structured body with an array of macroscopic structures as seen from above and from the side, respectively.
Figure 4:
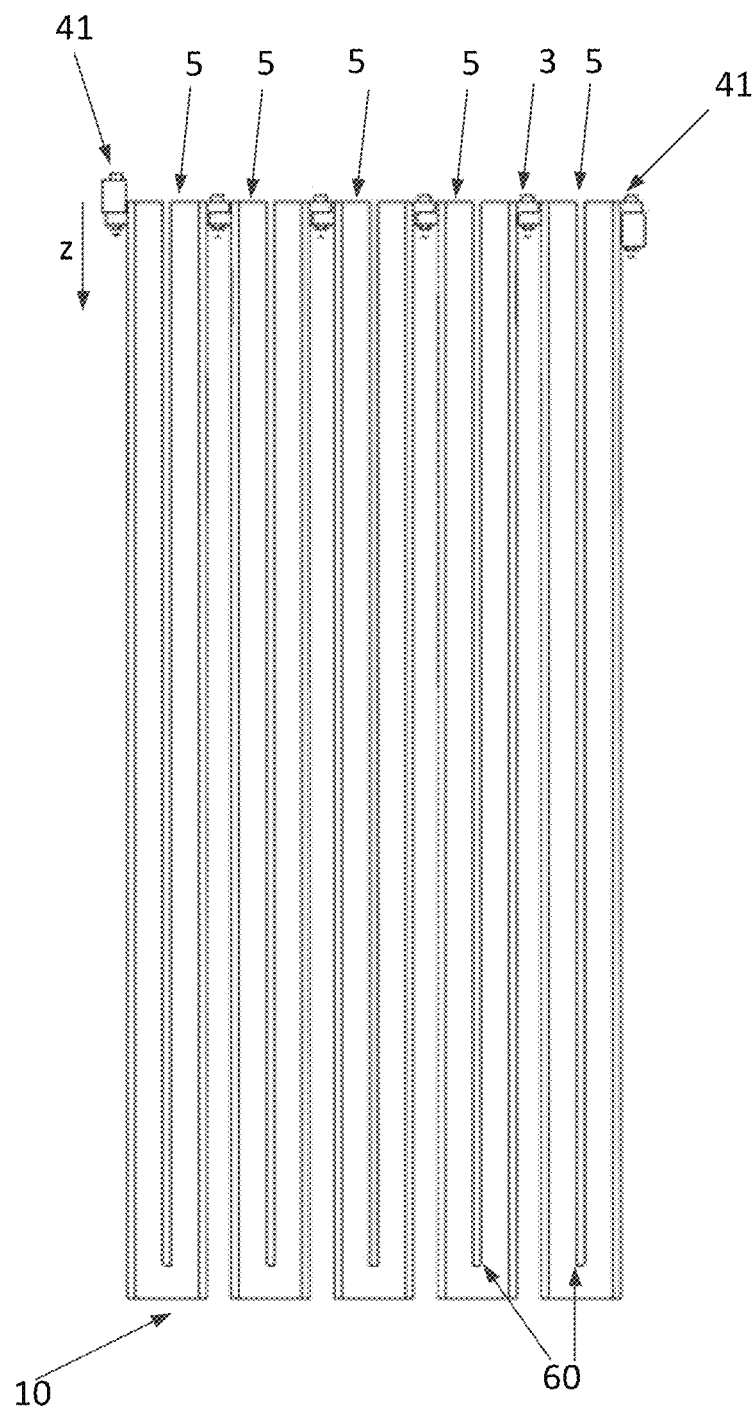

FIGS. 3 and 4 show an embodiment of a structured body comprising an array of macroscopic structures as seen from above and from the side, respectively. FIG. 3 shows a structured body 10 comprising an array of macroscopic structure 5 seen from above, viz. as seen from the arrow 11 in FIGS. 1a and 1b. The array has 6 rows, viz. 1a, 1b, 1c, 1d, 1e and 1f, of five macroscopic structures 5. The macroscopic structures 5 in each row are connected to its neighboring macroscopic structure (s) in the same row and the two outermost macroscopic structures in each row are connected to a conductor contact rail 41. The neighboring macroscopic structures 5 in a row of macroscopic structures are connected to each other by means of a connection piece 3.

FIG. 4 shows the structured body 10 having an array of macroscopic structures 5 of FIG. 3 seen from the side. From FIG. 4, it can be seen that each macroscopic structure 5 extends longitudinally perpendicular to the cross section seen in FIG. 3. Each macroscopic structure 5 has a slit 60 cut into it along its longitudinal direction (see FIG. 4). Therefore, when energized by the power source, the current enters the array of macroscopic structures 5 via a conductor contact rail 41, is led through the first macroscopic structure 5 downwards until the lower limit of the slit 60 and is subsequently led upwards towards a connection piece 3. The current is led via a corresponding zigzag path, downwards and upwards, through each macroscopic structure 5 in each row 1a-1f of macroscopic structures 5 in the array 10. This configuration advantageously increases the resistance over the structured body 10.

Figure 5:
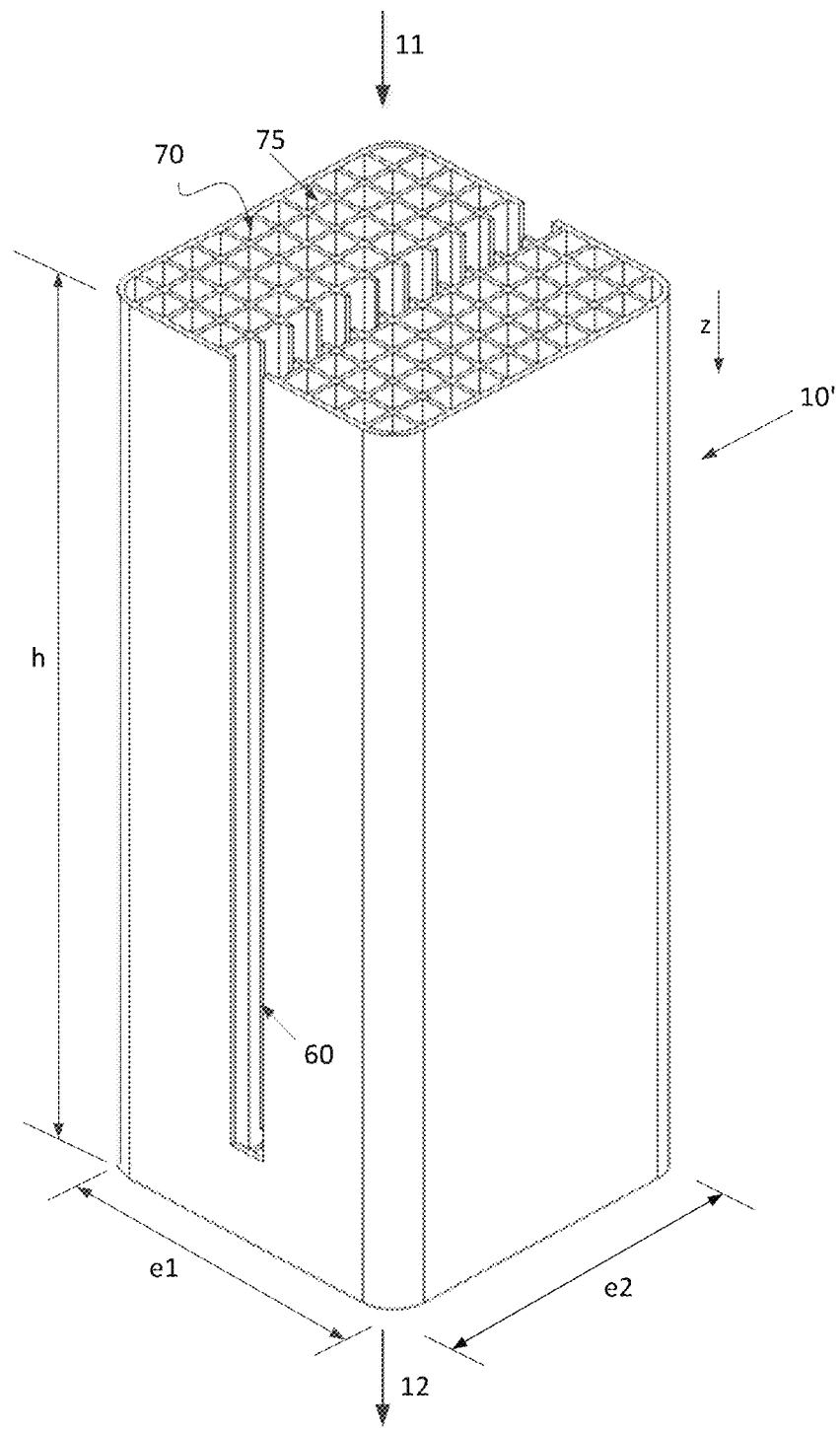
FIG. 5 shows an embodiment of the structured body of the invention.

FIG. 5 shows a structured body 10 according to the invention in a perspective view. The structured body 10 comprises a macroscopic structure that is coated with a ceramic coating. Within the structured body are channels 70 extending along the longitudinal direction (shown by the arrow indicate 'h' in FIG. 5) of the macroscopic structure 5; the channels are defined by walls 75. In the embodiment shown in FIG. 5, the walls 75 define a number of parallel, square channels 70 when seen from the direction of flow as indicated by the arrow 12. The structured body 10 has a substantially square perimeter when seen from above, defined by the edge lengths e1 and e2. However, the perimeter could also be circular or another shape.

The walls 75 of the structured body 10 are of extruded or 3D printed material coated with a ceramic coating, e.g. an oxide, which has been coated onto the macroscopic structure. In the Figures, the ceramic coating is not shown. The ceramic coating is present on every wall within the structured body 10 over which the gas flow flows during operation and interacts with the heated surface of the structured.

In the structured body 10 shown in FIG. 5 a slit 60 has been cut into the structured body 10. This slit 60 forces a current to take a zigzag route, in this instance downwards and subsequently upwards, within the macroscopic structure thereby increasing the current path and thus the resistance and consequently the heat dissipated within the macroscopic structure. The slit 60 within the macroscopic structure may be provided with embedded insulating material in order to ensure that no current flows in the transverse direction of the slit 60.

The channels 70 in the structured body 10 are open in both ends. In use of the structured body in a heating system, a feed gas flows through the unit, in the direction shown by arrows 11 and 12 in FIGS. 1a and 1b, and gets heated via contact with the walls 75 of the channels 70 and by heat radiation. The walls 75 of the channels 70 may e.g. have a thickness of 0.5 mm, and the ceramic coating coated onto the walls 75 may e.g. have a thickness of 0.1 mm. Even though the arrows 11 and 12 (see FIGS. 1a and 1b) indicate that the flow of the feed gas is down-flow, the opposite flow direction, viz. an up-flow, is also conceivable.

Figure 6:
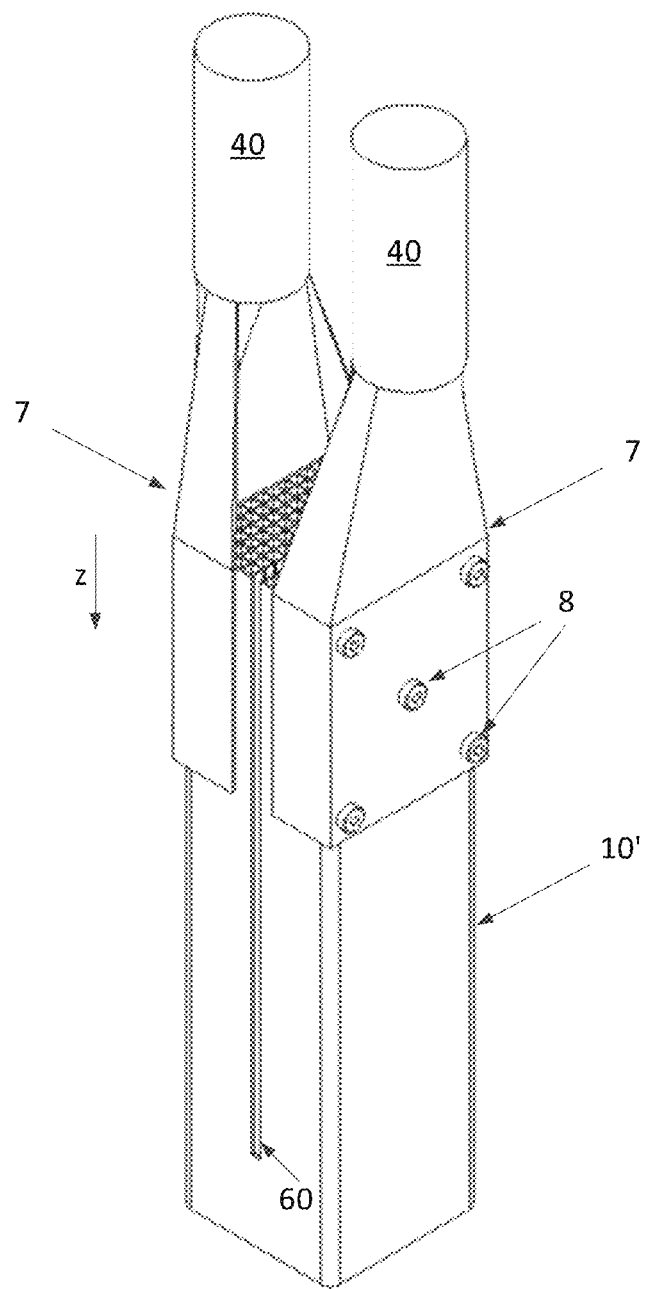
FIGS. 6 and 7 show embodiments of a structured body with connectors.

FIG. 6 shows the structured body 10 of FIGS. 1a and 1b in a perspective view and with connectors 7 attached. The connectors 7 each connect a part of the structured body 10 to a conductor 40. The conductors 40 are both connected to a power supply (not shown). Each of the connectors 7 are connected to an upper part of the structured body. When the conductors 40 are connected to a power supply, an electrical current is led to the corresponding connector 7 via the conductor and runs through the structured body 10. The slit 60 hinders the current flow in a transverse direction (horizontal direction of FIG. 6) throughout its lengths along the height h of the structured body 10. Therefore, the current runs in a direction downwards as seen in FIG. 6 in the part of the structured body along the slit 60, subsequently it runs transversely to the longitudinal direction below the slit 60 as seen in FIG. 6 and finally the current runs upwards in the longitudinal direction of the structured body to the other connector 7. The connectors 7 in FIG. 6 are mechanically fastened to the structured body by means of inter alia mechanical fastening means such as screws and bolts. However, additional or alternative fastening means are conceivable. In an embodiment, the electrical power supply generates a voltage of 3V and a current of 400 A. The connectors 7 are e.g. made in materials like iron, aluminum, nickel, copper or alloys thereof.

As mentioned, the structured body 10 may be coated with a ceramic coating, such as an oxide. However, the parts of the structured body 10, which are connected to the connectors 7, should not be coated with an oxide. Instead, the macroscopic structure of the structured body should be exposed or connected directly to the connectors 7 in order to obtain a good electrical connection between the macroscopic structure and the connector.

When the connectors 7 and thus the conductors 40 are connected to the same end of the structured body 10, viz. the upper end as seen in FIG. 6, the feed gas entering into a heating system housing the structured body 10 would be able to cool the connectors 7 and the conductors 40. For instance, the feed gas entering into such a heating system could have a temperature of 200° C. or 400° C. and would thus keep the connectors 7 and conductors 40 from reaching temperatures much higher than this temperature.

Figure 7:
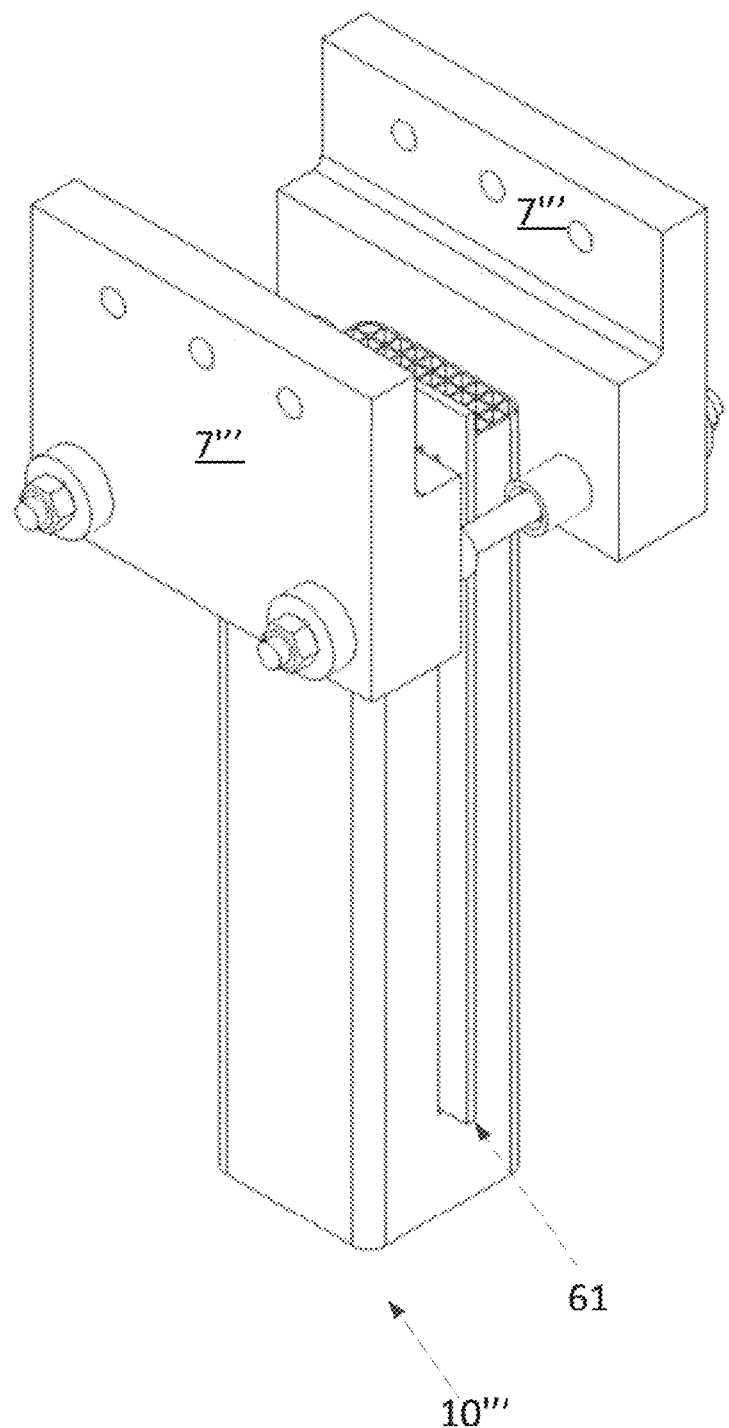

FIG. 7 shows another embodiment of a structured body 10''' with connectors 7'''. The structured body 10''' is e.g. the structured body as shown in FIG. 6. Each of the connectors 7''' has three holes at an upper side thereof for connection to conductors (not shown). A piece of electrically insulating material 61 is inside the slit 60 (see FIG. 5) of the structured body 10'''.

It should be noted, that even though the structured bodies shown in the figures are shown as having channels with a square cross section, as seen perpendicular to the z axis, any appropriate shape of the cross sections of the channels is conceivable. Thus, the channels of the structured body could alternatively be e.g. triangular, hexagonal, octagonal, or circular, where triangular, square, and hexagonal shapes are preferred.

Figure 8:
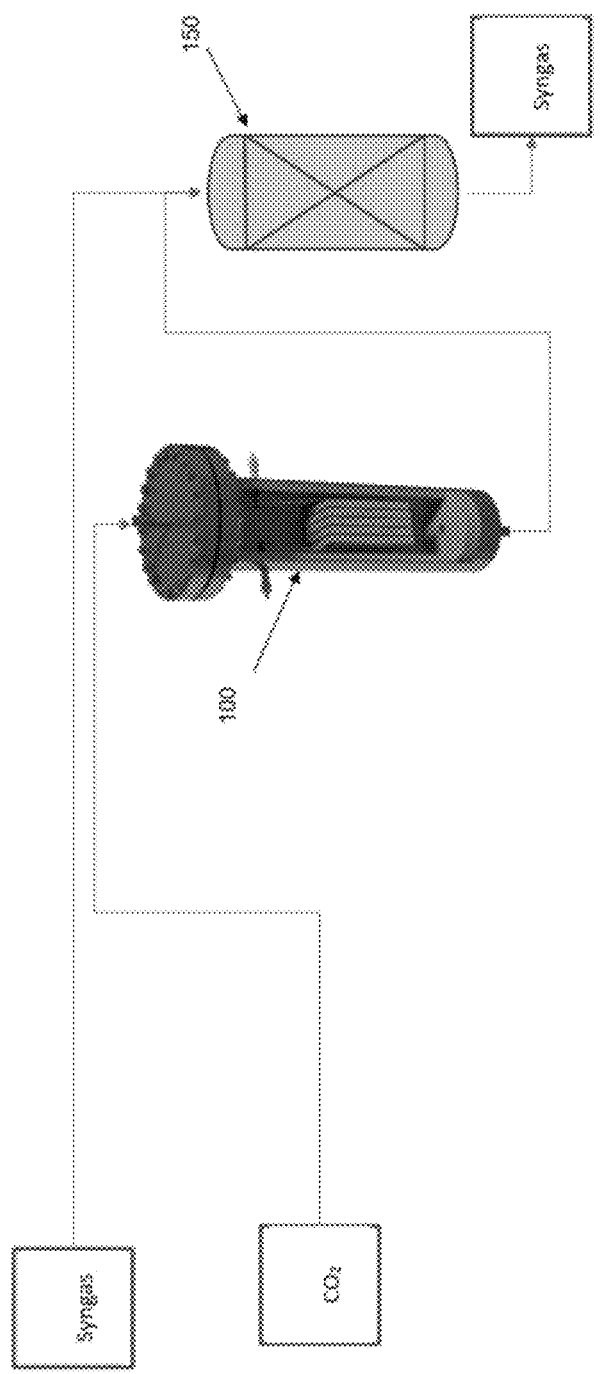
FIG. 8 shows an embodiment of the process including the heating system and an adiabatic post convertor.

FIG. 8 shows an embodiment of the process where a feedstock is provided by mixing syngas from a reforming reactor with a $CO_2$ feedstock, where the $CO_2$ is heated in a heating system 100 according to the invention. The heated $CO_2$ is mixed with the syngas before or in an adiabatic post convertor 150. This produces a product gas more rich in CO than said first product gas.

Figure 9:
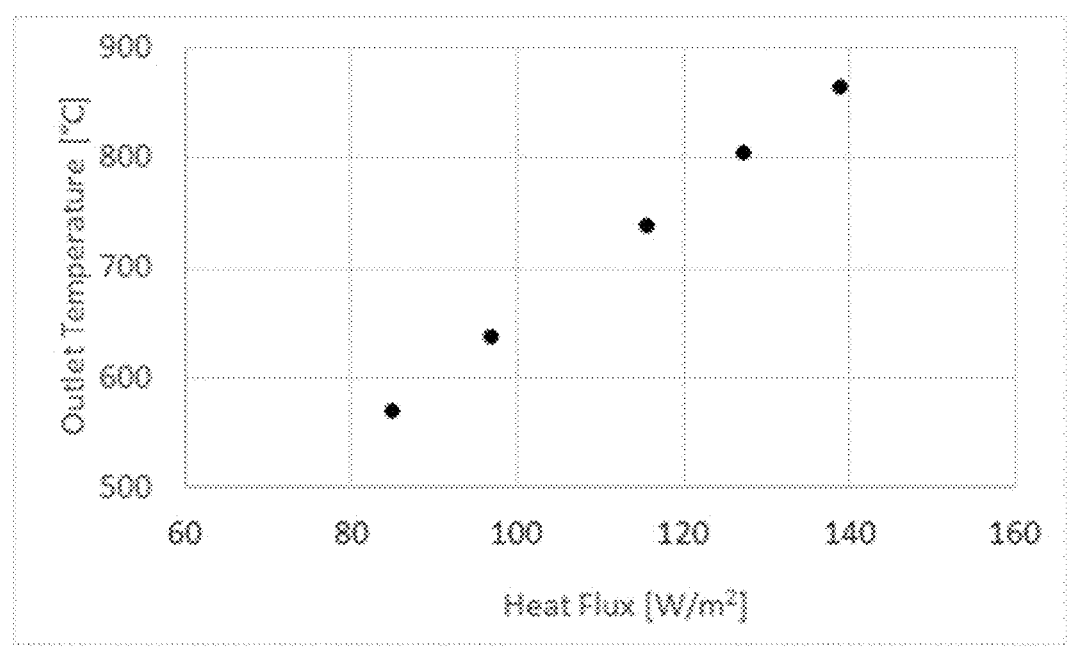
FIG. 9 shows experimental data for a heating system according to invention and the $CO_2$ process temperature as a function of electricity input.

FIG. 9 shows experimental data from an experiment using an embodiment of the heating system according to the invention. Using a monolith similar to FIG. 5 with a length of 12 cm and an outer edge length of 3 cm times 3 cm as structured body, the temperature of a pure $CO_2$ feedstock at a flowrate of 50 Nl/h and approximately 5 barg was elevated from approximately 150° C. inlet temperature to the temperature presented in FIG. 9 as function of input power. Input power is shown as the transferred energy to the system relative to the surface area of the monolith, which is shown as heat flux on the x-axis of the figure. As shown by the data, very high operating temperatures was achieved in the experiment, illustrating the high temperature capabilities of invention.

Figure 10:
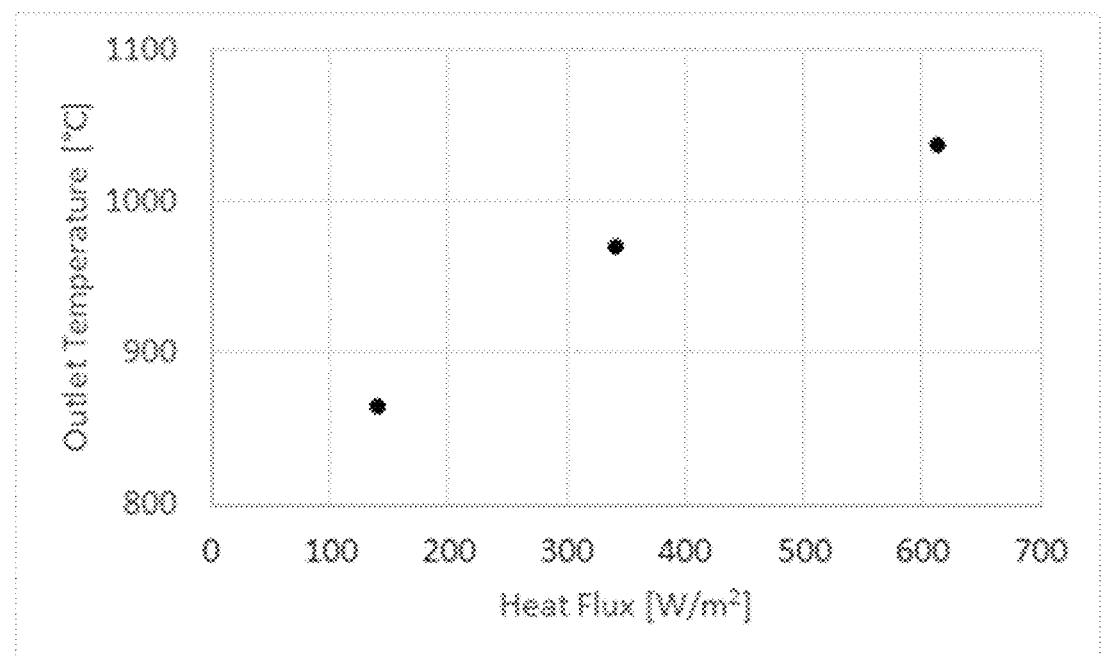
FIG. 10 shows experimental data for a heating system according to invention and the $CO_2$ process temperature as a function of electricity input.

FIG. 10 shows experimental data from an experiment similar to the experiment of FIG. 9. FIG. 10 shows another data series with $CO_2$ heating at 2.5 brag and a higher heat input to achieve temperatures exceeding 1000° C.

Figure 11:
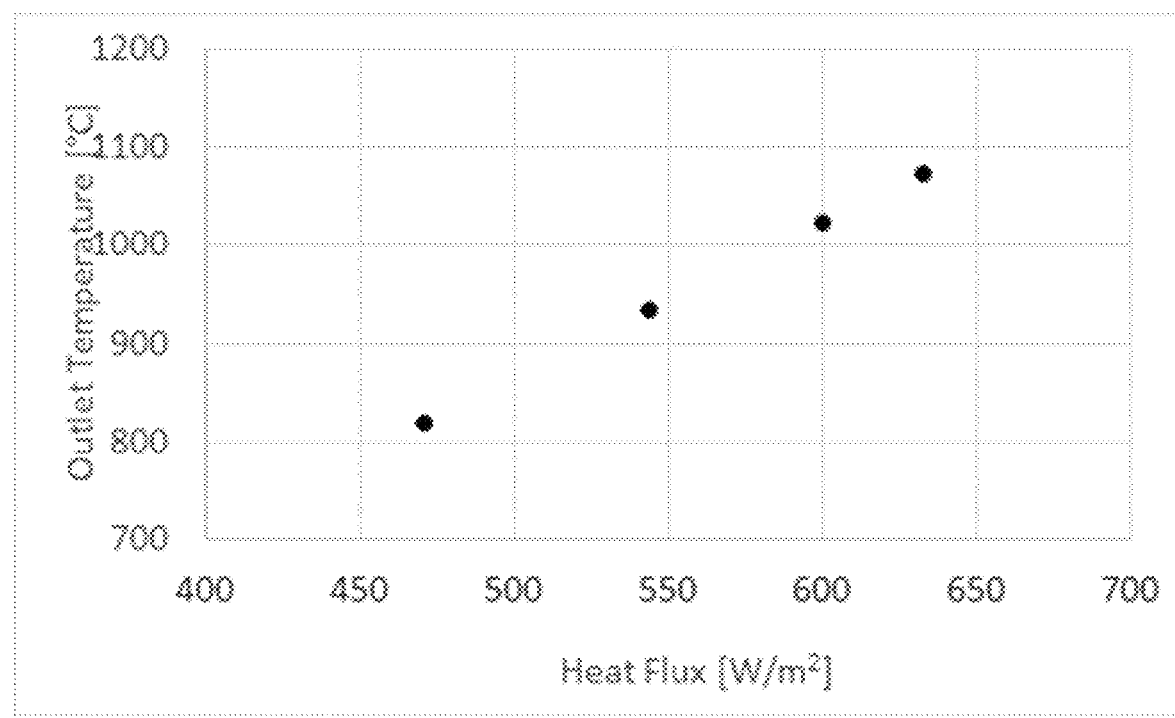
FIG. 11 shows experimental data for a heating system according to invention and the $N_2$ process temperature as a function of electricity input.

FIG. 11 shows experimental data from an experiment using an embodiment of the heating system according to the invention. Using a monolith similar to FIG. 5 with a length of 12 cm and an outer edge length of 3 cm times 3 cm as structured body, the temperature of a pure $N_2$ feedstock at a flowrate of 250 Nl/h and 3.2 barg was elevated from approximately 150° C. inlet temperature to the temperature presented in FIG. 11 as function of input power. As shown by the data, very high operating temperatures exceeding 1000° C. was achieved in the experiment, illustrating the high temperature capabilities of invention.

While the invention has been illustrated by a description of various embodiments and examples while these embodiments and examples have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

EXAMPLES

Comparative Example 1

As a comparative example, a case for synthesis gas module adjustment firstly using a traditional heating system for $CO_2$ preheating, as e.g. a tube heat exchanger placed in a fired heater of a chemical plant which gives a typical process gas preheating temperature of 650° C., is considered. Table 1 shows the composition of syngas, which in this case is produced in a tubular reformer. In parallel a $CO_2$ feed is preheated in a tube heat exchanger to 650° C. These streams are then mixed and sent an APOC where methanation/steam reforming and water gas shift reactions are taking place during an adiabatic reaction to produce a CO rich synthesis gas, in the given case increasing the CO yield by 36% from a fixed feedstock.

TABLE 1

Preheater coil

| | Syngas from reformer | Preheated $CO_2$ | Syngas from APOC |
|---|---|---|---|
| T [° C.] | 910 | 650 | 831 |
| P [barg] | 25.47 | 29.5 | 24.96 |
| F [$Nm^3/h$] | 9015 | 2000 | 10841 |
| Component flows [$Nm^3/h$] | | | |
| $CO_2$ | 480 | 1981 | 1694 |
| $N_2$ | 21 | 0 | 21 |
| $CH_4$ | 602 | 0 | 689 |
| $H_2$ | 4498 | 0 | 3470 |
| CO | 1876 | 0 | 2557 |
| $H_2O$ | 1538 | 19 | 2411 |

Comparative Example 2

As comparison to comparative example 1, the $CO_2$ preheater can be done according to the heating system of the invention to achieve a higher temperature. Using the same composition and amounts of syngas and $CO_2$ as in Table 1, but instead preheating the $CO_2$ to 1070° C., the process according to Table 2 is achieved. Mixing and sending the $CO_2$ and syngas to an APOC where methanation/steam reforming and water gas shift reactions are taking place during an adiabatic reaction produces a CO rich synthesis gas. In this case increasing the CO yield by 50% from a fixed feedstock, in contrast to 36% in Table 1. Also, the slip of $CH_4$ is decreased from 689 $Nm^3/h$ in Table 1 to 548 in Table 2.

TABLE 2

Electric gas heater

| | Syngas from reformer | Preheated $CO_2$ | Syngas from APOC |
|---|---|---|---|
| T [° C.] | 910 | 1070 | 855 |
| P [barg] | 25.47 | 29.5 | 24.96 |
| F [$Nm^3/h$] | 9015 | 2000 | 11123 |
| Component flows [$Nm^3/h$] | | | |
| $CO_2$ | 480 | 1981 | 1574 |
| $N_2$ | 21 | 0 | 21 |
| $CH_4$ | 602 | 0 | 548 |
| $H_2$ | 4498 | 0 | 3772 |
| CO | 1876 | 0 | 2818 |
| $H_2O$ | 1538 | 19 | 2391 |

The following numbered items are provided:

Item 1. A heating system for heating of a feed gas, said heating system comprising:
a supply of feed gas;
a structured body arranged for heating of said feed gas, said structured body comprising a macroscopic structure of electrically conductive material;
a pressure shell housing said structured body, said pressure shell comprising an inlet for letting in said feed gas and an outlet for letting out heated gas, wherein said inlet is positioned so that said feed gas enters said structured body in a first end of said structured body and said heated gas exits said structured body from a second end of said structured body;
a heat insulation layer between said structured body and said pressure shell;
at least two conductors electrically connected to said structured body and to an electrical power supply placed outside said pressure shell, wherein said electrical power supply is dimensioned to heat at least part of said structured body to a temperature of at least 400° C. by passing an electrical current through said macroscopic structure, wherein said at least two conductors are connected to the structured body at a position on the structured body closer to said first end of said structured body than to said second end of said structured body, and wherein the structured body is constructed to direct an electrical current to run from one conductor substantially to the second end of the structured body and return to a second of said at least two conductors; and,
an outlet for heated gas.

Item 2. The heating system according to item 1, wherein said electrical power supply is dimensioned to heat at least part of said structured body to a temperature of at least 700° C., preferably at least 900° C., more preferably at least 1000° C.

Item 3. The heating system according to any one of the preceding items, wherein the feed gas has essentially the same chemical composition at the inlet as at the outlet of the pressure shell housing.

Item 4. The heating system according to any one of the preceding items, wherein said macroscopic structure supports a ceramic coating.

Item 5. The heating system according to any one of the preceding items, wherein the pressure shell has a design pressure of between 2 and 30 bar.

Item 6. The heating system according to any one of items 1-5, wherein the pressure shell has a design pressure of between 30 and 200 bar.

Item 7. The heating system according to any one of the preceding items, wherein the resistivity of the electrically conductive material is between $10^{-5}$ $\Omega \cdot m$ and $10^{-7}$ $\Omega \cdot m$.

Item 8. The heating system according to any one of the preceding items, where said at least two conductors are led through the pressure shell in a fitting so that the at least two conductors are electrically insulated from the pressure shell.

Item 9. The heating system according to any one of the preceding items, wherein the connection between the structured body and said at least two conductors is a mechanical connection, a welded connection, a brazed connection or a combination thereof.

Item 10. The heating system according to any one of the preceding items, wherein the electrically conductive material comprises a 3D printed or extruded and sintered macroscopic structure.

Item 11. The heating system according to any one of items 4-10, wherein said ceramic coating is selected from $ZrO_2$, $Al_2O_3$, $MgAl_2O_4$, $CaAl_2O_4$ or mixtures thereof.

Item 12. The heating system according to any one of the preceding items, wherein the structured body comprises an array of macroscopic structures electrically connected to each other.

Item 13. The heating system according to any of the preceding items, wherein said structured body has at least one electrically insulating part arranged to direct a current through said structured body in order to ensure that for at least 70% of the length of said structured body, a current density vector of the principal current path has a non-zero component value parallel to the length of said structured body.

Item 14. The heating system according to any one of the preceding items, wherein said macroscopic body has a plurality of parallel channels, a plurality of non-parallel channels and/or a plurality of labyrinthic channels.

Item 15. The heating system according to any one of the preceding items, wherein the material of the macroscopic structure is chosen as a material arranged to generate a heat flux of 500 to 50000 $W/m^2$ by resistance heating of the material.

Item 16. The heating system according to any one of the preceding items, wherein the structured body comprises a first part arranged to generate a first heat flux and a second part arranged to generate a second heat flux, where the first heat flux is lower than the second heat flux, and where the first part is upstream the second part.

Item 17. The heating system according to any one of the preceding items, wherein the structured body comprises a third part arranged to generate a third heat flux, where the third heat flux is lower than the first and/or the second heat flux, and where the third part is downstream the first and/or second part.

Item 18. The heating system according to any one of the preceding items, wherein said heating system further comprises a control system arranged to control the electrical power supply to ensure that the temperature of the gas exiting the pressure shell lies in a predetermined range.

Item 19. The heating system according to any one of the preceding items, wherein the structured body within said heating system has a ratio between the area equivalent diameter of a horizontal cross section through the structured body and the height of the structured body in the range from 0.1 to 2.0.

Item 20. The heating system according to any one of the preceding items, wherein the height of the heating system is between 0.5 and 7 m, more preferably between 0.5 and 3 m.

Item 21. A process for heating a feed gas in a heating system according to any one of the preceding claims; said process comprising the steps of:
pressurizing said feed gas,
supplying said pressurized feed gas to the heating system,
supplying electrical power via electrical conductors connecting an electrical power supply placed outside said pressure shell to said structured body, allowing an electrical current to run through said electrically conductive material, thereby heating at least part of the structured body,
heating the feed gas over the structured body and outletting a heated gas from the heating system.

Item 22. The process according to item 21, wherein said feed gas is pressurised to a pressure between 2 and 30 bar.

Item 23. The process according to item 21, wherein said feed gas is pressurised to a pressure between 30 and 200 bar.

Item 24. The process according to any one of items 21-23, wherein at least part of the structured body is heated to a temperature of at least 700° C., preferably at least 900° C., more preferably at least 1000° C.

Item 25. The process according to any one of items 21-24, wherein the heated gas from the heating system is substantially pure $CO_2$ and is provided to an adiabatic post converter together with a synthesis gas; and in said adiabatic post converter, the heated gas reacts with the synthesis gas to thereby provide a second product gas, said second product gas being a CO rich synthesis gas stream.

Item 26. A method for rapidly heating a feedstock in a heating system according to any one of items 1-20, from a first steady-state heating condition (A) to a second steady-state heating condition (B) or vice-versa; said method comprising the steps of:
in said first steady-state heating condition (A):
supplying said feedstock to the heating system in a first total flow, and
supplying a first electrical power via electrical conductors connecting anelectrical power supply placed outside said pressure shell to said structured body, thereby allowing a first electrical current to run through said electrically conductive material,
thereby heating at least part of the structured body to a first temperature at which said feedstock is heated over said structured body under said first steady-state heating conditions (A); and said first heated gas is outlet from the heating system;
and, in said second steady-state heating condition (B):
supplying said feedstock to the heating system in a second total flow,
supplying a second electrical power via electrical conductors connecting an electrical power supply placed outside said pressure shell to said structured body, thereby allowing a second electrical current to run through said electrically conductive material,
thereby heating at least part of the structured body to a second temperature; at which said feedstock is heated over said structured body under said second steady-state heating conditions (B); and said second heated gas is outlet from the heating system;
wherein said second electrical power is higher than said first electrical power; and/or said second total flow is higher than said first total flow.

Item 27. The method according to item 26, wherein said at least two conductors are connected to the structured body at a position on the structured body closer to said first end of said structured body than to said second end of said structured body, and wherein the structured body is constructed to direct an electrical current to run from one conductor substantially to the second end of the structured body and return to a second of said at least two conductors.

Item 28. The method according to any one of items 26-27, wherein the ratio of total gas feed flow in said first heating condition A to said second heating condition B (A:B) is at least 1:10.

Item 29. The method according to any one of items 26-28, wherein the heated gas outlet temperature from the structured body in heating condition B is between 50° C. to 600° C. higher, such as between 100° C. to 500° C. higher, preferably between 150° C. to 400° C. higher than the heated gas outlet temperature from the structured body in heating condition A.

Item 30. The method according to any one of items 26-29, wherein the switch between heating condition A and B includes a gradual change of the total gas feed flow from said first total flow to said second total flow and simultaneous gradual change of the applied electrical potential over said electrically conductive material from said first to said second electrical power.

Item 31. The method according to any one of items 26-30, wherein the heated gas outlet temperature from the structured body in heating condition B is no more than 50° C. higher than the heated gas outlet temperature from the structured body in heating condition A.

Item 32. The method according to any one of items 26-31, wherein a proportional-integral-derivative (PID) controller controls the electrical potential based on feedback reading of the process value of heated gas outlet temperature from the structured body.

Item 33. The method according to any one of items 26-32, wherein the heated gas outlet temperature from the structured body is measured directly beneath or on the most downstream surface of the structured body.

Item 34. The method according to any one of items 26-33, wherein the switch between heating condition A and B takes place over a period of less than 3 hours, such as less than 2 hours, such as less than 60 min, preferably less than 30 min, and even more preferably less than 15 min.

Item 35. The method according to any one of items 26-34, wherein the switch between heating condition A and B involves supplying a second electrical power to the structured body.

Item 36. The method according to any one of items 26-35, wherein the switch between heating condition A and B comprises a transition state between said heating conditions A and B; said transition state comprising a first period in which the electrical power is switched off, followed by a second period in which said second electrical power of condition B is supplied to the structured body.

Item 37. The method according to any one of items 26-36, wherein the switch between heating condition A and B comprises a transition state between said heating conditions A and B; said transition state comprising a first period in which a third electrical power is supplied to the structured body, followed by a second period in which said second electrical power of condition B is supplied to the structured body, said third electrical power being higher than the second electrical power.

The invention claimed is:

1. A heating system for heating of a feed gas, said heating system comprising:
   a supply of feed gas;
   a structured body arranged for heating of said feed gas, said structured body comprising a macroscopic structure of electrically conductive material;
   a pressure shell housing said structured body, said pressure shell comprising an inlet for letting in said feed gas and an outlet for letting out heated gas, wherein said inlet is positioned so that said feed gas enters said structured body in a first end of said structured body and said heated gas exits said structured body from a second end of said structured body;
   a heat insulation layer between said structured body and said pressure shell;
   at least two conductors electrically connected to said structured body and to an electrical power supply placed outside said pressure shell, wherein said electrical power supply is dimensioned to heat at least part of said structured body to a temperature of at least 400° C. by passing an electrical current through said macroscopic structure, wherein said at least two conductors are connected to the structured body at a position on the structured body closer to said first end of said structured body than to said second end of said structured body, and wherein the structured body is constructed to direct an electrical current to run from one conductor substantially to the second end of the structured body and return to a second of said at least two conductors; and,
   an outlet for heated gas,
   wherein the feed gas has essentially the same chemical composition at the inlet as at the outlet of the pressure shell housing.

2. The heating system according to claim 1, wherein said electrical power supply is dimensioned to heat at least part of said structured body to a temperature of at least 700° C.

3. The heating system according to claim 1, wherein the feed gas is selected from the group consisting of $N_2$, $H_2$, $CO_2$, $CH_4$, $H_2O$, $O_2$, and a mixture thereof.

4. The heating system according to claim 1, wherein said macroscopic structure supports a ceramic coating.

5. The heating system according to claim 1, wherein the resistivity of the electrically conductive material is between $10^{-5}$ $\Omega \cdot m$ and $10^{-7}$ $\Omega \cdot m$.

6. The heating system according to claim 1, where said at least two conductors are led through the pressure shell in a fitting so that the at least two conductors are electrically insulated from the pressure shell.

7. The heating system according to claim 1, wherein said structured body has at least one electrically insulating part arranged to direct a current through said structured body in order to ensure that for at least 70% of the length of said structured body, a current density vector of the principal current path has a non-zero component value parallel to the length of said structured body.

8. The heating system according to claim 1, wherein the material of the macroscopic structure is chosen as a material arranged to generate a heat flux of 500 to 50000 $W/m^2$ by resistance heating of the material.

9. The heating system according to claim 1, wherein the structured body within said heating system has a ratio between the area equivalent diameter of a horizontal cross section through the structured body and the height of the structured body in the range from 0.1 to 2.0.

10. A process for heating a feed gas in a heating system, said heating system comprising:
    a supply of feed gas;
    a structured body arranged for heating of said feed gas, said structured body comprising a macroscopic structure of electrically conductive material;
    a pressure shell housing said structured body, said pressure shell comprising an inlet for letting in said feed gas and an outlet for letting out heated gas, wherein said inlet is positioned so that said feed gas enters said structured body in a first end of said structured body and said heated gas exits said structured body from a second end of said structured body;

a heat insulation layer between said structured body and said pressure shell;

at least two conductors electrically connected to said structured body and to an electrical power supply placed outside said pressure shell, wherein said electrical power supply is dimensioned to heat at least part of said structured body to a temperature of at least 400° C. by passing an electrical current through said macroscopic structure, wherein said at least two conductors are connected to the structured body at a position on the structured body closer to said first end of said structured body than to said second end of said structured body, and wherein the structured body is constructed to direct an electrical current to run from one conductor substantially to the second end of the structured body and return to a second of said at least two conductors; and an outlet for heated gas, said process comprising the steps of:
pressurizing said feed gas,
supplying said pressurized feed gas to the heating system,
supplying electrical power via electrical conductors connecting an electrical power supply placed outside said pressure shell to said structured body, allowing an electrical current to run through said electrically conductive material, thereby heating at least part of the structured body,
heating the feed gas over the structured body and outletting a heated gas from the heating system.

11. The process according to claim 10, wherein at least part of the structured body is heated to a temperature of at least 700° C.

12. The process according to claim 10, wherein the heated gas from the heating system is substantially pure $CO_2$ and is provided to an adiabatic post converter together with a synthesis gas; and in said adiabatic post converter, the heated gas reacts with the synthesis gas to thereby provide a second product gas, said second product gas being a CO rich synthesis gas stream.

13. A method for rapidly heating a feedstock in a heating system, from a first steady-state heating condition (A) to a second steady-state heating condition (B) or vice-versa; said heating system comprising:
a supply of feed gas;
a structured body arranged for heating of said feed gas, said structured body comprising a macroscopic structure of electrically conductive material;
a pressure shell housing said structured body, said pressure shell comprising an inlet for letting in said feed gas and an outlet for letting out heated gas, wherein said inlet is positioned so that said feed gas enters said structured body in a first end of said structured body and said heated gas exits said structured body from a second end of said structured body;

a heat insulation layer between said structured body and said pressure shell;

at least two conductors electrically connected to said structured body and to an electrical power supply placed outside said pressure shell, wherein said electrical power supply is dimensioned to heat at least part of said structured body to a temperature of at least 400° C. by passing an electrical current through said macroscopic structure, wherein said at least two conductors are connected to the structured body at a position on the structured body closer to said first end of said structured body than to said second end of said structured body, and wherein the structured body is constructed to direct an electrical current to run from one conductor substantially to the second end of the structured body and return to a second of said at least two conductors; and an outlet for heated gas, said method comprising the steps of:
in said first steady-state heating condition (A):
supplying said feedstock to the heating system in a first total flow, and
supplying a first electrical power via electrical conductors connecting an electrical power supply placed outside said pressure shell to said structured body, thereby allowing a first electrical current to run through said electrically conductive material,
thereby heating at least part of the structured body to a first temperature at which said feedstock is heated over said structured body under said first steady-state heating conditions (A); and said first heated gas is outlet from the heating system;
and, in said second steady-state heating condition (B):
supplying said feedstock to the heating system in a second total flow,
supplying a second electrical power via electrical conductors connecting an electrical power supply placed outside said pressure shell to said structured body, thereby allowing a second electrical current to run through said electrically conductive material,
thereby heating at least part of the structured body to a second temperature; at which said feedstock is heated over said structured body under said second steady-state heating conditions (B); and said second heated gas is outlet from the heating system;
wherein said second electrical power is higher than said first electrical power; and/or said second total flow is higher than said first total flow.

14. The method according to claim 13, wherein the ratio of total gas feed flow in said first heating condition A to said second heating condition B (A:B) is at least 1:10.

15. The method according to claim 13, wherein the heated gas outlet temperature from the structured body in heating condition B is between 50° C. to 600° C. higher than the heated gas outlet temperature from the structured body in heating condition A.

* * * * *